(12) United States Patent
Michaeli et al.

(10) Patent No.: US 12,475,913 B2
(45) Date of Patent: Nov. 18, 2025

(54) COMPUTERIZED DISTRESS CALL DETECTION AND AUTHENTICATION

(71) Applicant: ORACLE INTERNATIONAL CORPORATION, Redwood Shores, CA (US)

(72) Inventors: Guy G. Michaeli, Seattle, WA (US); Timothy D. Cline, Gainesville, VA (US); Stephen J. Green, Burlington, MA (US); Serge Le Huitouze, Rennes (FR); Matthew T. Gerdes, San Diego, CA (US); Guang Chao Wang, San Diego, CA (US); Kenny C. Gross, Escondido, CA (US)

(73) Assignee: Oracle International Corporation, Redwood Shores, CA (US)

( * ) Notice: Subject to any disclaimer, the term of this patent is extended or adjusted under 35 U.S.C. 154(b) by 239 days.

(21) Appl. No.: 17/989,978

(22) Filed: Nov. 18, 2022

(65) Prior Publication Data

US 2023/0230613 A1 Jul. 20, 2023

Related U.S. Application Data

(60) Provisional application No. 63/300,632, filed on Jan. 18, 2022.

(51) Int. Cl.
*G10L 25/63* (2013.01)
*G06F 40/30* (2020.01)
(Continued)

(52) U.S. Cl.
CPC ............. *G10L 25/63* (2013.01); *G10L 15/02* (2013.01); *G10L 25/03* (2013.01)

(58) Field of Classification Search
CPC ......... G10L 25/63; G10L 15/02; G10L 25/03; G10L 17/26; G10L 15/26; G06F 40/30
See application file for complete search history.

(56) References Cited

U.S. PATENT DOCUMENTS

| 4,686,655 A | 8/1987 | Hyatt |
|---|---|---|
| 7,020,802 B2 | 3/2006 | Gross et al. |

(Continued)

FOREIGN PATENT DOCUMENTS

| CN | 107181543 A1 | 9/2017 | |
|---|---|---|---|
| CN | 110263322 A * | 9/2019 | ............. G10L 15/26 |

(Continued)

OTHER PUBLICATIONS

Garcia-Martin Eva et al., "Estimation of Energy Consumption in Machine Learning," Journal of Parallel and Distributed Computing, Elsevier, Amsterdan, NL, vol. 134, Aug. 21, 2019 (Aug. 21, 2019), pp. 77-88.

(Continued)

*Primary Examiner* — Paras D Shah
*Assistant Examiner* — Mulugeta Tuji Dugda
(74) *Attorney, Agent, or Firm* — Kraguljac Law Group LLC

(57) ABSTRACT

Systems, methods, and other embodiments associated with computer distress-call detection and authentication are described. In one embodiment, a method includes detecting a human voice in audio content of a radio signal. Speech is recognized in the human voice to transform the human voice into text and vocal metrics. Feature scores are generated that represent features of the recognized speech based at least in part on the vocal metrics. The human voice is then classified as either a hoax distress call or an authentic distress call based on the feature scores. An alert is then presented (Continued)

indicating that the human voice is one of the hoax distress call or the authentic distress call.

20 Claims, 6 Drawing Sheets

(51) Int. Cl.
*G10L 15/02* (2006.01)
*G10L 25/03* (2013.01)

(56) References Cited

U.S. PATENT DOCUMENTS

| | | |
|---|---|---|
| 7,191,096 B1 | 3/2007 | Gross et al. |
| 7,281,112 B1 | 10/2007 | Gross et al. |
| 7,292,659 B1 | 11/2007 | Gross et al. |
| 7,391,835 B1 | 6/2008 | Gross et al. |
| 7,542,995 B2 | 6/2009 | Thampy et al. |
| 7,573,952 B1 | 8/2009 | Thampy et al. |
| 7,613,576 B2 | 11/2009 | Gross et al. |
| 7,613,580 B2 | 11/2009 | Gross et al. |
| 7,702,485 B2 | 4/2010 | Gross et al. |
| 7,869,977 B2 | 1/2011 | Lewis et al. |
| 8,055,594 B2 | 11/2011 | Dhanekula et al. |
| 8,069,490 B2 | 11/2011 | Gross et al. |
| 8,150,655 B2 | 4/2012 | Dhanekula et al. |
| 8,200,991 B2 | 6/2012 | Vaidyanathan et al. |
| 8,214,682 B2 | 7/2012 | Viadyanathan et al. |
| 8,275,738 B2 | 9/2012 | Gross et al. |
| 8,341,759 B2 | 12/2012 | Gross et al. |
| 8,365,003 B2 | 1/2013 | Gross et al. |
| 8,452,586 B2 | 5/2013 | Master et al. |
| 8,457,913 B2 | 6/2013 | Zwinger et al. |
| 8,543,346 B2 | 9/2013 | Gross et al. |
| 9,093,120 B2 | 7/2015 | Bilobrov |
| 9,514,213 B2 | 12/2016 | Wood et al. |
| 9,911,336 B2 | 3/2018 | Schlechter et al. |
| 9,933,338 B2 | 4/2018 | Noda et al. |
| 10,015,139 B2 | 7/2018 | Gross et al. |
| 10,452,510 B2 | 10/2019 | Gross et al. |
| 10,496,084 B2 | 12/2019 | Li et al. |
| 10,860,011 B2 | 12/2020 | Gross et al. |
| 10,929,776 B2 | 2/2021 | Gross et al. |
| 11,042,428 B2 | 6/2021 | Gross et al. |
| 11,055,396 B2 | 7/2021 | Gross et al. |
| 11,255,894 B2 | 2/2022 | Wetherbee et al. |
| 11,392,786 B2 | 7/2022 | Gross et al. |
| 11,563,852 B1* | 1/2023 | Can .................. H04M 3/5175 |
| 11,646,009 B1* | 5/2023 | Chhetri .................. G10L 15/16 704/232 |
| 11,816,987 B2* | 11/2023 | Dantrey .................. G06N 3/044 |
| 2003/0061008 A1 | 3/2003 | Smith et al. |
| 2007/0288242 A1 | 12/2007 | Spengler et al. |
| 2008/0140362 A1 | 6/2008 | Gross et al. |
| 2008/0252309 A1 | 10/2008 | Gross et al. |
| 2008/0252441 A1 | 10/2008 | McElfresh et al. |
| 2008/0256398 A1 | 10/2008 | Gross et al. |
| 2009/0099830 A1 | 4/2009 | Gross et al. |
| 2009/0125467 A1 | 5/2009 | Dhanekula et al. |
| 2009/0306920 A1 | 12/2009 | Zwinger et al. |
| 2010/0023282 A1 | 1/2010 | Lewis et al. |
| 2010/0033386 A1 | 2/2010 | Lewis et al. |
| 2010/0161525 A1 | 6/2010 | Gross et al. |
| 2010/0305892 A1 | 12/2010 | Gross et al. |
| 2010/0306165 A1 | 12/2010 | Gross et al. |
| 2012/0030775 A1 | 2/2012 | Gross et al. |
| 2012/0111115 A1 | 5/2012 | Ume et al. |
| 2012/0245978 A1 | 9/2012 | Jain et al. |
| 2013/0157683 A1 | 6/2013 | Lymberopoulos et al. |
| 2015/0137830 A1 | 5/2015 | Keller, III et al. |
| 2016/0097833 A1 | 4/2016 | Han et al. |
| 2016/0098561 A1 | 4/2016 | Keller et al. |
| 2017/0078479 A1* | 3/2017 | Feast .................. G10L 25/63 |
| 2017/0163669 A1 | 6/2017 | Brown et al. |
| 2017/0301207 A1 | 10/2017 | Davis et al. |
| 2018/0011130 A1 | 1/2018 | Aguayo Gonzalez et al. |
| 2018/0276044 A1 | 9/2018 | Fong et al. |
| 2018/0349797 A1 | 12/2018 | Garvey et al. |
| 2019/0102718 A1 | 4/2019 | Agrawal |
| 2019/0163719 A1 | 5/2019 | Gross et al. |
| 2019/0196892 A1 | 6/2019 | Matei et al. |
| 2019/0197145 A1 | 6/2019 | Gross et al. |
| 2019/0237997 A1 | 8/2019 | Tsujii et al. |
| 2019/0243799 A1 | 8/2019 | Gross et al. |
| 2019/0286725 A1 | 9/2019 | Gawlick et al. |
| 2019/0313230 A1* | 10/2019 | MacGabann .......... H04W 4/90 |
| 2019/0378022 A1 | 12/2019 | Wang et al. |
| 2020/0125819 A1 | 4/2020 | Gross et al. |
| 2020/0191643 A1 | 6/2020 | Davis |
| 2020/0201950 A1 | 6/2020 | Wang et al. |
| 2020/0387753 A1 | 12/2020 | Brill et al. |
| 2021/0081573 A1* | 3/2021 | Gross .................... G06F 21/552 |
| 2021/0158202 A1 | 5/2021 | Backlawski et al. |
| 2021/0174248 A1 | 6/2021 | Wetherbee et al. |
| 2021/0270884 A1 | 9/2021 | Wetherbee et al. |
| 2021/0352176 A1* | 11/2021 | Van Den Dungen ........................ A61B 5/1117 |
| 2022/0121955 A1 | 4/2022 | Chavoshi et al. |
| 2022/0189502 A1* | 6/2022 | Alemu .................... G10L 25/63 |

FOREIGN PATENT DOCUMENTS

| | | | | |
|---|---|---|---|---|
| CN | 110265001 A | * | 9/2019 | .......... G06F 16/635 |
| CN | 110941020 A1 | | 3/2020 | |
| CN | 107274888 B | * | 9/2020 | .......... G06F 18/285 |
| DE | 4447288 A1 | | 7/1995 | |
| EP | 3811245 A1 | * | 4/2021 | ............ G06F 40/20 |
| JP | 2021019337 A | * | 2/2021 | ............ G10L 15/22 |
| WO | WO-2010122843 A1 | * | 10/2010 | ............ G10L 25/87 |

OTHER PUBLICATIONS

Patent Cooperation Treaty (PCT), International Search Report and Written Opinion issued in PCT International Application No. PCT/US2020/060083 having a date of mailing of Mar. 19, 2021 (13 pgs).
Patent Cooperation Treaty (PCT), International Search Report and Written Opinion issued in PCT International Application No. PCT/US2021/015802 having a date of mailing of May 28, 2021 (13 pgs).
Patent Cooperation Treaty (PCT), International Search Report and Written Opinion issued in PCT International Application No. PCT/US2021/013633 having a date of mailing of May 6, 2021 (10 pgs).
Huang H, et al. "Electronic counterfeit detection based on the measurement of electromagnetic fingerprint," Microelectronics Reliability: An Internat . Journal & World Abstracting Service, vol. 55, No. 9, Jul. 9, 2015 (Jul. 9, 2015) pp. 2050-2054.
Bouali Fatma et al. "Visual mining of time series using a tubular visualization," Visual Computer, Springer, Berlin, DE, vol. 32, No. 1, Dec. 5, 2014 (Dec. 5, 2014), pp. 15-30.
Patent Cooperation Treaty (PCT), International Search Report and Written Opinion issued in PCT International Application No. PCT/US2021/014106 having a date of mailing of Apr. 26, 2021 (9 pgs).
Patent Cooperation Treaty (PCT), International Search Report and Written Opinion issued in PCT International Application No. PCT/US2021/015359 having a date of mailing of Apr. 9, 2021 (34 pgs).
Ray; Frequency Calibration for SDRs Without GPS, pp. 1-9, Feb. 15, 2018; downloaded from: https://www.amsat.org/wordpress/wp-content/uploads/2018/02/2017Symposium-SDR-Freq-Calibration.pdf.
Dickey et al.; Checking for Autocorrelation in Regression Residuals; pp. 959-965; Proceedings of 11th Annual SAS Users Group International Conference; 1986.
Hoyer et al.; Spectral Decomposition and Reconstruction of Nuclear Plant Signals; pp. 1153-1158; published Jan. 1, 2005; downloaded on Jul. 14, 2021 from: https://support.sas.com/resources/papers/proceedings-archive/SUGI93/Sugi-93-193%20Hoyer%20Gross.pdf.
Gou, Yuhua, "Implementation of 3d Kiviat Diagrams." (2008). (Year: 2008).

(56) References Cited

OTHER PUBLICATIONS

Wang, Ray C., et al., Process Fault Detection Using Time-Explicit Kiviat Diagrams. AlChE Journal 61.12 (2015): 4277-4293.
US Patent and Trademark Office, "Non-Final Office Action", issued in U.S. Appl. No. 16/804,531 having a date of mailing of Jul. 20, 2021 (51 pgs).
Whisnant et al.; "Proactive Fault Monitoring in Enterprise Servers," IEEE—International Multiconference in Computer Science & Computer Engineering (Jun. 27-30, 2005) 11 pgs.
US Nuclear Regulatory Commission; "Technical Review of On-Line Monitoring Techniques for Performance Assessment," vol. 1, Jan. 31, 2006.
Gribok, et al,. "Use of Kernel Based Techniques for Sensor Validation in Nuclear Power Plants," International Topical Meeting on Nuclear Plant Instrumentation, Controls, and Human-Machine Interface Technologies (NPIC & HMIT 2000), Washington, DC, Nov. 2000, pp. 1-15.
Singer, et al., "Model-Based Nuclear Power Plant Monitoring and Fault Detection: Theoretical Foundations," Intelligent System Application to Power Systems (ISAP '97), Jul. 6-10, 1997, Seoul, Korea pp. 60-65.
Wald, A, "Sequential Probability Ratio Test for Reliability Demonstration", John Wiley & Sons, 1947.
Patent Cooperation Treaty (PCT), International Search Report and Written Opinion issued in PCT International Application No. PCT/US2021/062380 having a date of mailing of May 24, 2022 (10 pgs).
Abebe Diro et al.; A Comprehensive Study of Anomaly Detection Schemes in IoT Networks Using Machine Learning Algorithms; pp. 1-13; 2021; downloaded from: https://doi.org/10.3390/s21248320.
Zhenlong Xiao, et al.; Anomalous IoT Sensor Data Detection: An Efficient Approach Enabled by Nonlinear Frequency-Domain Graph Analysis; IEEE Internet of Things Journal, Aug. 2020; pp. 1-11.
Gross Kenny et al: "AI Decision Support Prognostics for IoT Asset Health Monitoring, Failure Prediction, Time to Failure", 2019 International Conference on Computational Science and Computational Intelligence (CSCI), IEEE, Dec. 5, 2019, pp. 244-248.
Paulraj, et al; "Moving Vehicle Recognition and Classification Based on Time Domain Approach", Malaysian Technical Universities Conference on Engineering & Technology, MUCET 2012, Part 1—Electronic and Electrical Engineering, Procedia Engineering 53, pp. 405-410 (https:\\www.sciencedirect.com).
Seyerlehner, Klaus et al., "Frame Level Audio Similarity—A Codebook Approach", Proc. of the 11th Int. Conference on Digital Audio Effects (DAFx-08), Espoo, Finland, Sep. 1-4, 2008 (8 pgs).
Casey, et al.; "Audio Shingling for Measuring Musical Similarity", Purdue University—Engineering 2006 pp. 1-8.
Choi Kukjin et al: "Deep Learning for Anomaly Detection in Time-Series Data: Review, Analysis, and Guidelines", IEEE Access, IEEE, USA, vol. 9, Aug. 26, 2021, (23 pgs).
Gross, Kenny, Oracle Labs; MSET2 Overview: "Anomaly Detection and Prediction" Oracle Cloud Autonomous Prognostics; p. 1-58; Aug. 8, 2019.
Gross, K. C. et al., "Application of a Model-Based Fault Detection System to Nuclear Plant Signals," downloaded from https://www.researchgate.net/publication/236463759; Conference Paper: May 1, 1997, 5 pages.
Verma, Guarav et al., "A Lexical, Syntactic, and Semantic Perspective for Understanding Style in Text," Sep. 18, 2019; pp. 1-9; BigData Experience Lab, Adobe Research, India.

* cited by examiner

COMPUTERIZED DISTRESS CALL DETECTION AND AUTHENTICATION

CROSS REFERENCE TO RELATED APPLICATIONS

This disclosure claims the benefit of U.S. Provisional Patent Application Ser. No. "63/300,632" filed Jan. 18, 2022, titled "AUTONOMOUS EMERGENCY DISTRESS-CALL DETECTION, CHARACTERIZATION, AND AUTHENTICATION FRAMEWORK", having inventors: Guy G. Michaeli, Timothy D. Cline, Stephen J. Green, Serge Le Huitouze, Matthew T. Gerdes, Guang C. Wang, and Kenny C. Gross, and assigned to the present assignee, which is incorporated by reference herein in its entirety.

BACKGROUND

It is difficult, if not impossible, for computers to "hear" a voice distress call in a background of squawking radio static. Further, identification of what is an authentic distress call and what is not an authentic distress call has been an entirely subjective human decision that computers have heretofore been unable to make. Hoax distress calls may cause unnecessary performance of tremendous emergency response operations. It is also feared that legitimate or authentic distress calls may be disregarded or missed entirely.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Systems, methods, and other embodiments are described herein that provide for autonomous emergency distress call detection, characterization, and authentication by a computer. In one embodiment, a distress call detection and authentication system identifies human voice in a radio signal and determines whether the voice is an authentic distress call or a hoax distress call. In one embodiment, the chance of missing a voice distress call in radio noise is reduced or eliminated, and subjectivity of determining the distress call to be a hoax distress call or an authentic distress call is also reduced or eliminated.

For example, the distress call detection and authentication system autonomously detects and extracts human voice from the audio content of radio frequencies monitored for voice distress calls. Upon detection of the human voice, it is unknown as to whether the voice is an authentic distress call, or a hoax. The distress call detection and authentication system further autonomously classifies the detected human voice as either a hoax distress call or an authentic distress call based on the verbal content of the human voice.

—Example Distress Call Detection and Authentication System—

Figure 1:
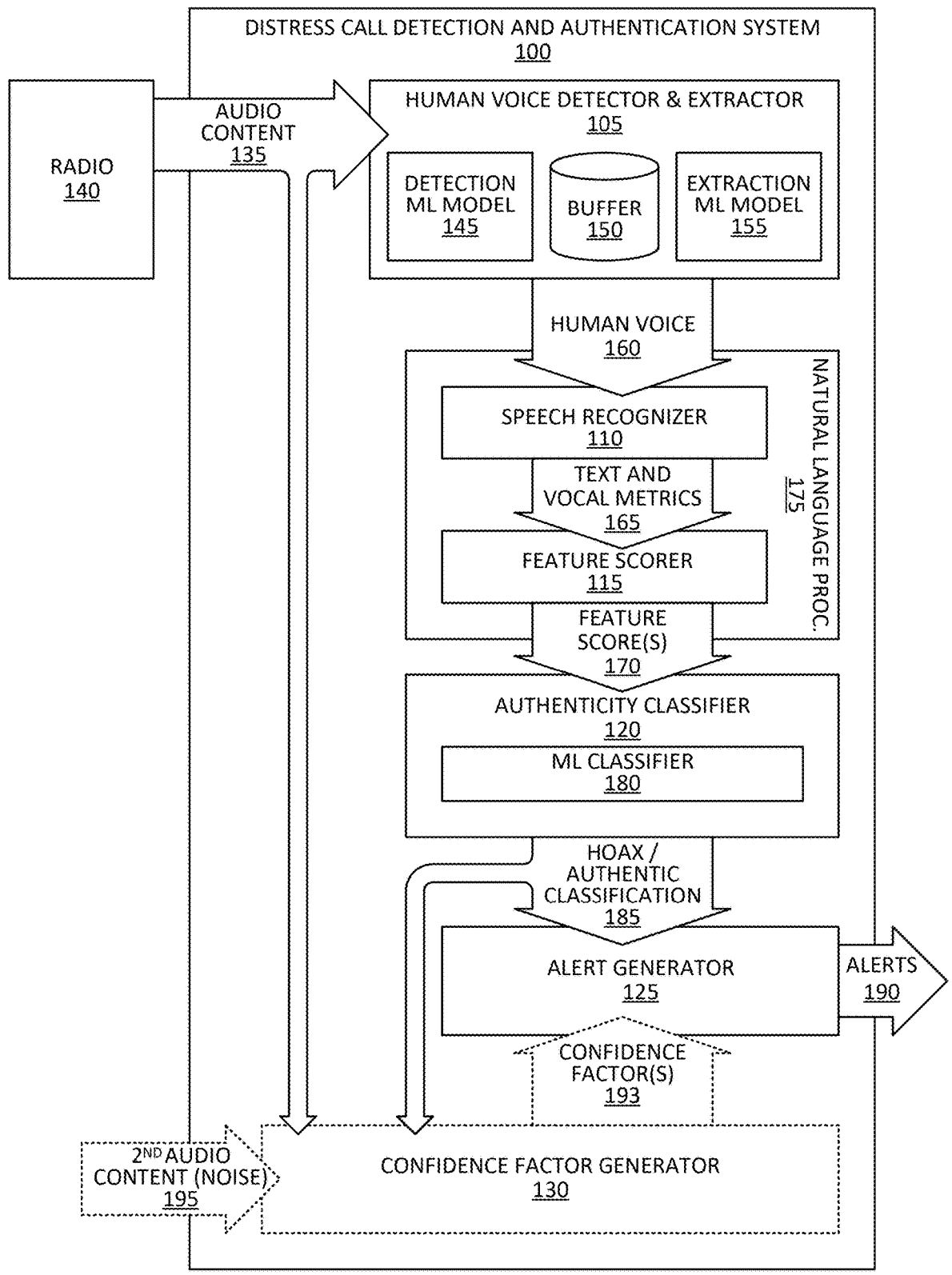
FIG. 1 illustrates one embodiment of a distress call detection and authentication system associated with autonomous emergency distress call detection, characterization, and authentication.

FIG. 1 illustrates one embodiment of a distress call detection and authentication system 100 associated with autonomous emergency distress call detection, characterization, and authentication. Distress call detection and authentication system 100 includes components for human voice detector and extractor 105, speech recognizer 110, feature scorer 115, authenticity classifier 120, and alert generator 125. In one embodiment, distress call detection and authentication system 100 further includes components for confidence factor generation 130. In one embodiment each of these components 105, 110, 115, 120, 125, and 130 of distress call detection and authentication system 100 may be implemented as software executed by computer hardware. For example, components 105, 110, 115, 120, 125, and 130 may be implemented as one or more intercommunicating software modules, routines, or services for performing the functions of the components (as described below with reference to FIG. 5 under the heading "Example Environment").

Human voice detector and extractor 105 is configured to detect a human voice as an anomaly in audio content 135 of a radio signal. The presence of human voice may be considered an anomaly because for the vast majority of the time (for example, 99% or more) the monitored radio signals carry random incoherent radio frequency noise. In one embodiment, human voice detector and extractor 105 provides high-sensitivity detection of human voice when voice content carried by the radio signal is above the noise floor, that is, the voice content has higher individual audio frequency amplitudes than does the random incoherent noise on the radio signal.

Also, in one embodiment, human voice detector and extractor 105 can detect and extract faint or indistinct human voice content that falls below the noise floor due to correlated activity between signals. (The noise floor is where the voice content carried by the radio signal has lower individual audio frequency amplitudes than does the random incoherent noise on the radio signal.) When the audio frequencies that most optimally represent human voice frequencies appear below the noise floor, they nevertheless have non-random correlations that allow human voice extractor to distinguish and extract the voice from the largely random normal background noise. In one embodiment, human voice detector and extractor 105 discerns or identifies the presence of voice from audio content 135 of a radio signal with higher discrimination accuracy than human ears listening to radio frequency (RF) background noise. Thus, in one embodiment, the technique works well when for the majority of the time the signal content in the emergency-band frequencies is random incoherent noise, even when the correlated frequency content representing human voice may have amplitudes with very small signal-to-noise ratios, and may in fact be "below the noise floor".

The radio signal may be received and converted to the audio content 135 by radio 140, and then provided to human voice detector and extractor 105. For example, detection of the human voice may be performed with a machine learning model that has been trained to identify human voice as an anomaly in noise, such as detection ML model 145. Detection ML model 145 may be configured to activate recording of the audio content 135 in a buffer 150 upon detection of human voice in audio content 135. Detection ML model 145 may be configured to de-activate recording of the audio content 135 in a buffer 150 following cessation of human voice in audio content 135.

Human voice detector and extractor 105 is also configured to extract the human voice from audio content 135. For example, extraction of human voice 160 may be performed with a machine learning model that has been trained to identify human voice as an anomaly in noise, such as extraction ML model 155. Extraction ML model 155 is configured to extract human voice 160 from the portions of the audio content 135 that are recorded in buffer 150 as residuals between model-predicted noise and the recorded portions of audio content 135 containing human voice 160. The residuals between expected noise and the audio content 135 form a de-noised signature of human voice 160. Human voice 160 may be generated as a data structure for digitally recording audio information, such as a time series database as shown and described in further detail herein.

The extracted human voice 160 is provided to speech recognizer 110 and/or feature scorer 115. Speech recognizer 110 is configured to recognize speech in the human voice 160 to transform the human voice 160 into text. Speech recognizer 110 is configured to analyze the human voice 160 to transcribe speech in the human voice 160 as text and vocal metrics 165. Text and vocal metrics 165 is a representation of speech recognized in the extracted human voice 160 using text of the spoken words and metrics of vocal characteristics with which the words were spoken. Text and vocal metrics 165 may be generated as one or more data structures for digitally recording speech information. In one embodiment, text and vocal metrics 165 represent individual words with text of the word and values for one or more vocal characteristics of the way the word was spoken. As used herein, vocal characteristics refers to properties or qualities specific to sound produced by vocalization or speech. Vocal metrics refers to the values of the vocal characteristics. These characteristics may be analyzed or measured to produce the vocal metrics. In one embodiment, text and vocal metrics 165 are recorded in one or more token data structures.

Text and vocal metrics 165 are provided to feature scorer 115. Feature scorer 115 is configured to generate feature score(s) 170 for one or more feature(s) about the recognized speech from text and vocal metrics 165. Examples of features about the speech include tone, inflection, sentiment, various emotions, and flatness of expression. Feature scores 170 represent metadata about the recognized speech in a numerical format. Feature scores 170 may be generated as one or more data structures for storing numerical data. Speech recognizer 110 and feature scorer 115 may both be components of a broader natural language processing 175 system for computer analysis of human natural language and speech.

Feature scores 170 are provided to authenticity classifier 120. Authenticity classifier 120 is configured to classify the human voice 160 as either a hoax distress call or an authentic distress call based on the feature score(s) 170 generated from the text 165 and/or human voice 160. For example, classification of the human voice 160 as either a hoax or an authentic distress call may be performed with a machine learning classifier 180 that has been trained to distinguish between hoax and authentic distress calls based on feature scores. Authenticity classifier 120 thus produces a hoax/authentic classification 185 of the extracted human voice 160. Hoax/authentic classification 185 may be generated as a data structure for storing an indication that a distress call is a hoax or authentic.

Hoax/authentic classification 185 is provided to alert generator 125. Alert generator 125 is configured to present an alert 190 indicating that the human voice is one of the hoax distress call or the authentic distress call. Alert generator 125 may compose an electronic message that indicates that human voice 160 was detected, and that indicates whether the human voice 160 was determined to be a hoax distress call or an authentic, genuine distress call based on hoax/authentic classification 185. (As used herein with reference to distress calls, the terms authentic and genuine are synonyms indicating that the distress call is real, and not a hoax). The alert may further include access to an audio record of the extracted and enhanced human voice 160 and a transcript of the distress call based on text 165. The alert 190 may be generated as a REST request, an email, or other electronic message. Alert generator 125 transmits the alert 190 to cause the content of the alert to be presented to a user of distress call detection and authentication system 100.

In one embodiment, hoax/authentic classification 185 and audio content 135 are also provided to a confidence factor generator. Confidence factor generator 130 is configured to generate one or more confidence factors 193. Confidence factors 193 may be, for example, a hoax confidence factor as to whether the hoax/authentic classification 185 was correct, or a detection confidence factor as to whether human voice 160 was correctly identified to be human voice. Confidence factors 193 produced by confidence factor generator represent, in a numerical format, a likelihood that a determination is correct. Confidence factors 193 may be generated as one or more data structures for storing numerical data. Confidence factors 193 may be provided to alert generator 125 by confidence factor generator 130. Alert generator 125 may include one or more confidence factors 193 in the content of alert 190.

Further details regarding distress call detection and authentication system 100 are presented herein. In example embodiments, the operation of distress call detection and authentication system 100 will be described with example methods for distress call detection and authentication shown and described with reference to FIGS. 2 and 4. An example audio frequency surface is shown and described with reference to FIG. 3.

—Example Distress Call Detection and Authentication Method—

Figure 2:
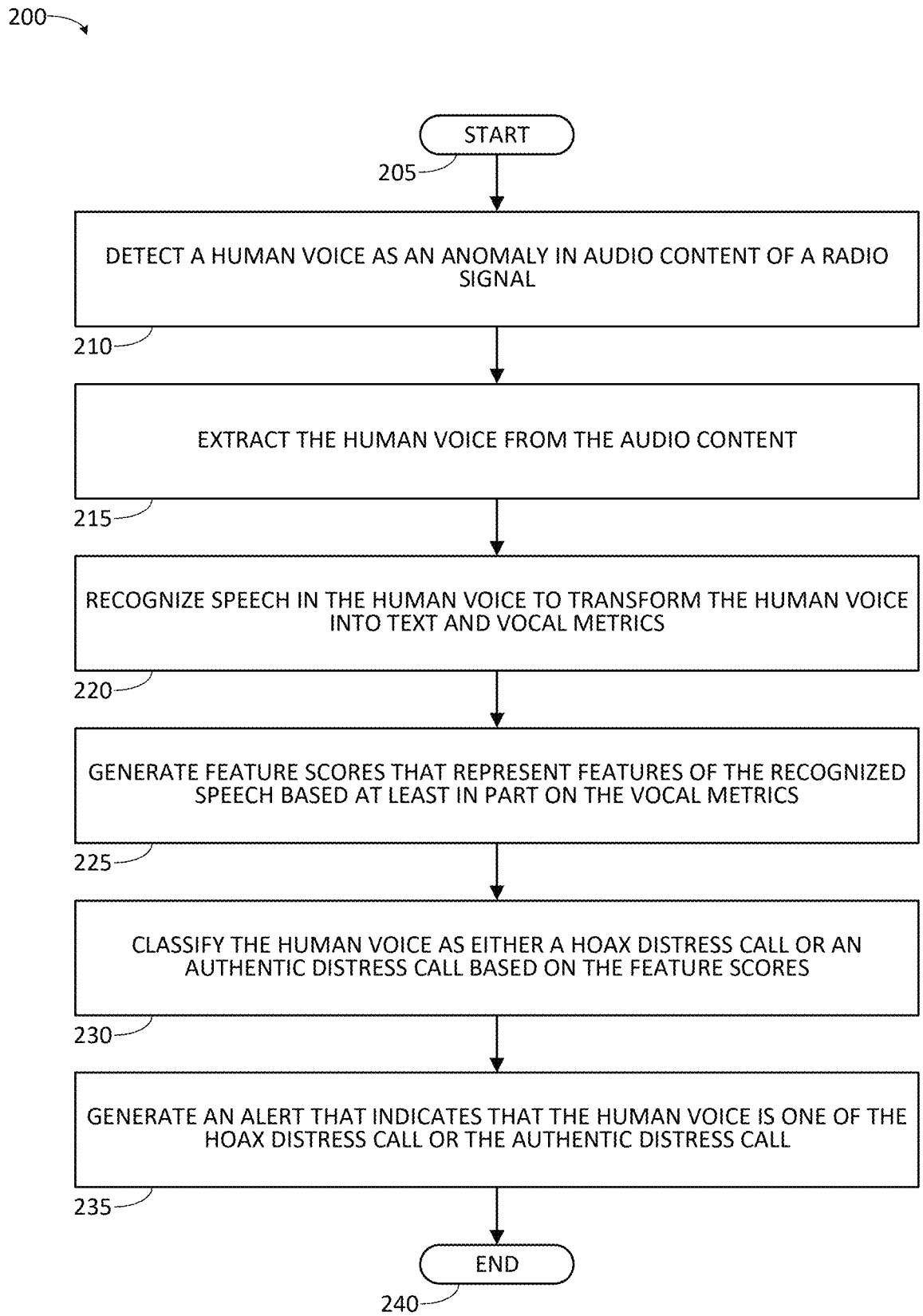
FIG. 2 illustrates one embodiment of a distress call detection and authentication method associated with autonomous emergency distress-call detection, characterization, and authentication.

FIG. 2. illustrates one embodiment of a distress call detection and authentication method 200 associated with autonomous emergency distress call detection, characterization, and authentication. In distress call detection and authentication method 200, a human voice is detected as an anomaly in audio content of a radio signal. The human voice is then extracted from the audio content. Speech is then recognized in the human voice to transform the human voice into text. A feature score is generated for a feature about the text of the recognized speech. The human voice is then classified as either a hoax distress call or an authentic distress call based on the feature score. An alert is then presented that indicates that the human voice is one of the hoax distress call or the authentic distress call.

In one embodiment, distress call detection and authentication method 200 initiates at start block 205 in response to a processor of a computer determining one or more of: (i) audio content of a radio signal has been or is being received by distress call detection and authentication system 100; (ii) a user or administrator of distress call detection and authentication system 100 has initiated method 200; (iii) it is currently a time at which distress call detection and authentication method 200 is scheduled to be run or launched; (iv) human voice is present in audio content of a radio signal; or (v) distress call detection and authentication method 200 should commence in response to occurrence of some other condition. In one embodiment, the computer is configured by computer-executable instructions to execute functions of distress call detection and authentication system 100. In one embodiment, the steps of method 200 are performed as a streaming workflow that processes audio content values as they arrive from a radio. Following initiation at start block 205, method 200 continues to process block 210.

At process block 210, the method detects a human voice as an anomaly in audio content of a radio signal. The human voice is suspected to be a distress call because the radio signal is an emergency channel, thus the human voice may also be referred to herein as a suspected distress call. Thus, at process block 210, the method receives a suspected distress call in audio format. The method detects the suspected distress signal (human voice) so that the suspected distress call human voice may be extracted from background noise and analyzed to confirm whether the suspected distress call is authentic or a hoax. For example, the method processes a time series of audio content that is translated from the radio signal. The processing is performed in order to select audio frequency bins of the audio content that are most likely to include human voice. Once the audio frequency bins are selected, they are monitored with a ML model. The ML model used for monitoring has been trained to identify an anomaly where human voice occurs in the selected audio frequency bins instead of static noise. Where human voice occurs in the selected audio frequency bins, the ML model may trigger an alert. In this way, the method autonomously discriminates a human voice from radiofrequency noise in audio content.

The radio signal is an electromagnetic wave used to carry information such as distress calls. The radio signal may use a radio frequency or channel that is designated or set aside for communicating distress calls, also referred to as a distress frequency. A radio receiver such as a software defined radio scans the distress frequency to receive the radio signal. The radio translates the radio signal into audio content. While the human ear is not involved in detecting the human voice, the radio frequency signal is converted to audio content because subsequent processing, such as natural language processing and feature scoring for tone, inflection, and emotion (as discussed herein), is performed based on vocal characteristics derived from the acoustic sound. Generally, the audio content carried by the radio signal is static noise and, occasionally, human voice. Because the audio content is from radio frequencies reserved for distress calls, it is presumed that human voice in audio content is a distress call, whether hoax or authentic.

Because the audio frequency spectrum of the audio content received from the radio is continuous, the audio frequency spectrum may be divided into a set of discrete audio frequency ranges, also referred to herein as "bins." A baseline width of a fine bin is defined to set a finest resolution for a bin. In one embodiment, the fine bin is defined to be 1 Hz wide, although finer resolutions (such as 0.1 Hz or 0.01 Hz) may be available. In one embodiment, the width of the fine bin is a native resolution of or finest resolution available from the spectrum analyzer. As used herein, the term "fine-grained frequencies" refers to the audio frequencies for the fine bins. In one embodiment, where the finest resolution bin is 1 Hz, the fine-grained frequencies are at 1 Hz increments across the audio frequency spectrum. For example, a fine-grained frequency at 20 Hz, 21 Hz, . . . , 19,999 Hz, 20,000 Hz.

The amplitude values of the audio content at an audio frequency may be sampled (for example, with a spectrum analyzer) at an interval of time to produce a time series signal of amplitude values of the audio content at the audio frequency. The interval of time is a period for the sampling or sampling period, and the inverse of the interval of time is a rate for the sampling or sampling rate. The amplitude values at more than one audio frequency may be sampled to produce a time series database of audio frequencies. As used herein, the term "time series signal" refers to a data structure in which a series of data points (such as observations or sampled values) are indexed in time order. As used herein, the term "time series database" refers to a data structure that includes one or more time-series signals sharing an index (such as a series of time stamps or observation numbers) in common.

The fine-grained frequencies are the resolution of the sampling in the frequency domain. The sampling period is the resolution of the sampling in the time domain. The amplitude values of the audio content at the fine-grained frequencies may be sampled at the sampling rate by the spectrum analyzer to produce time series signals for the fine-grained frequencies that are indexed in increments of the sampling period. The radio (with spectrum analyzer) thus generates the audio content as a time series database of sound translated from the radio signal. The generated time series database has a time series signal for each of a set of fine-grained audio frequencies. Upon conversion from continuous time and frequency sound waveform to a set or database of sampled time series, the audio content may be considered to be digitized.

Data points of the time series signal for the fine-grained audio frequency are amplitudes of sound at the fine-grained audio frequency. The time series database for the audio content therefore includes amplitudes of sound at each of the sampled audio frequencies. Data points from the time series signals in the time series database for the audio content may be streamed from the radio (with spectrum analyzer), with data points for each time series signal arriving in real time as the audio content is translated from the radio signal. Generating the audio content from the radio signal is described in additional detail herein for example with reference to process block 410 of method 400.

Human voice is not a mono-frequency sound, but is an envelope or group of multiple harmonic frequencies. Therefore, where audio content includes human voice, there are patterns of correlation between or among the audio frequency bins that are associated with the human voice. For example, the amplitude of frequencies associated with human voice rise and fall together when the voice is speaking. Where the audio content does not include human voice, these correlation patterns are absent.

As discussed above, where audio content consists generally of static noise, voice may be considered an anomaly. An anomaly is a deviation in the audio content from the expected static noise. An anomaly in an individual signal of the audio content may be produced by random radiofrequency noise, and does not indicate of the presence of human voice in the audio content. An anomaly that indicates the presence of human voice in the audio content is a deviation from the expected static noise that is correlated across multiple frequency bins associated with human voice. The bins associated with human voice may be identified by analysis of historical distress calls. Thus, where anomalies occur simultaneously across multiple bins associated with human voice, human voice is detected. Alerts that human voice is detected may be triggered when anomalies occur simultaneously across multiple bins associated with human voice. The alert may initiate recording of the voice, as discussed below.

Anomalies where the audio content deviates from expected static noise may be detected by a predictive ML model that is trained to expect or predict static noise, such as detection ML model 145. For example, a multivariate predictive ML model such as a multivariate state estimation technique (MSET) model may be used to monitor the audio content at selected frequency ranges, also referred to herein as "bins." The bins may be represented by individual time series in a time series database, with an individual time series sampled from each of the frequency ranges.

For random radiofrequency noise, the bins associated with human voice frequency ranges are random and incoherent, and do not show correlated activity. When any degree of human voice content is present, then the frequency bins that are associated with human voice content are correlated. The time series for the bins of the audio content may be analyzed by the multivariate predictive ML model that is trained to predict static noise, and an alert may be triggered by a detection model (such as SPRT) when an individual time series signal has an anomalous value. When multiple individual time series signals have anomalous values at the same time, alerts are triggered for multiple time series, and voice has been detected. Thus, detection of human voice occurs when alerts occur simultaneously on discrete time series in the time series database for the audio content.

In one embodiment, the frequencies associated with human voice are identified by the presence of correlation patterns between frequencies. For example, because human speech varies in volume and pitch, the sound content in individual frequency bins associated with human voice show correlated activity during speech. For example, due to the multiple harmonic frequencies involved in speech, correlated activity appears across bass, midrange, and treble frequency ranges during speech. In one embodiment, a machine learning (ML) model is used to learn the correlation patterns between the fine-grained frequencies that are indicative of human voice. The ML model learns which fine-grained frequencies move upward or downward in unison when voice is present. The ML model learns these intra-frequency correlation patterns from historical distress calls that include human voice. For example, the ML model may learn the correlation patterns between the fine-grained frequencies from a database of historical distress calls that were determined to be authentic, and from a second database of historical distress calls that were determined to be hoaxes. Including both authentic and hoax calls in training ensures that there is no bias towards recognizing only authentic or only hoax calls as human voice.

As discussed above, an audio frequency spectrum of the audio content may be divided into bins. In one embodiment, the bins selected to be monitored may be fine bins that include one fine-grained frequency. In one embodiment, the bins selected to be monitored may be "coarse bins"-bins that span multiple fine-grained frequencies. The bins selected for monitoring may be a subset of the bins that cover the available frequency ranges. For example, where the audio spectrum is divided into 100 coarse bins, the selected bins may be, for example, 20 of those 100 coarse bins. Selection of the bins for monitoring may be performed as an initial setup step prior to initiation of method 200. The 20 coarse bins selected are systematically determined from empirical pattern recognition described in further detail below to be those bins that are most highly correlated human voice narrow frequencies that yield the highest precision discrimination from a database of prior genuine distress calls on the monitored "emergency frequency bands", both authentic and hoax calls. Selection on this basis is described in further detail below, for example with reference to process blocks 420-430 of method 400.

The detection ML model has been trained to identify human voice as an anomaly in random and chaotic static noise. Once trained, the detection ML model identifies human voice as an anomaly by predicting a static noise value for each of the time series signals based on the received values for the other time series signals, and comparing the predicted and received values for each signal. Therefore, when monitoring the time series signals for the selected bins, an alert is triggered where the model-predicted value for a time series signal differs from the actual value for the time series signal in a manner that satisfies a binary-hypothesis test for the presence of an anomaly. The binary-hypothesis test continuously evaluates with all new digitized samples coming in between a null hypothesis and an anomaly hypothesis. The null hypothesis is that the temporal sequence of observations are consistent with learned "normal" or expected ambient RF noise, with a configurable confidence factor for the null hypothesis ($CF_{NULL}$), such as 99.9%. The anomaly hypothesis is that there are narrow-frequency patterns detected in the noise that are consistent with human voice, also with a configurable confidence factor for the anomaly hypothesis ($CF_{ANOMALY}$), again, such as 99.9%. The binary-hypothesis test for the presence of an anomaly is satisfied when the anomaly hypothesis is true with at least the confidence factor for the anomaly hypothesis ($CF_{ANOMALY}$). Satisfying the test indicates that the temporal distribution of the frequency bins being monitored (for example, the top 20 optimal bins) is anomalous with reference to expected static RF noise, and therefore contains human voice (superimposed upon normal ambient static noise). In one embodiment, the binary-hypothesis test may be the sequential probability ratio test (SPRT) as discussed below. An alert from the test indicates detection of the presence of human voice as an anomaly in audio content that is otherwise static noise.

In one embodiment, the steps of process block 210 are performed by human voice detector and extractor 105 (including detection ML model 145) of distress call detection and authentication system 100. Additional detail about voice detection, including discussion of model training and audio content monitoring, is described herein with reference to process blocks 415-440 (voice detection process 450) of method 400. Process block 210 completes, and distress call detection and authentication method 200 continues at process block 215. At the completion of process block 210, audio content of a radio signal has been received and monitored for anomalous human voice in expected static noise. Where human voice (such as a suspected distress call) occurs in the audio content instead of static noise alone, an anomaly is detected. The detection of the anomaly indicates the presence of human voice. A human voice (the suspected distress call) the method has been autonomously discriminated or perceived from radiofrequency noise in the audio content. Thus, a suspected distress call has been received in audio format in the audio content.

The detection of the human voice may be used to activate a process of recording the audio content that contains the human voice in a buffer. Cessation of detection of the human voice may be used to de-activate the process of recording the audio content into the buffer. The use of anomaly detection to control recording in the buffer is described in additional detail below with reference to process blocks 435-445 of method 400). The audio content is recorded in the buffer as a time series database. The audio content may be recorded in the buffer in relatively higher detail than the audio content monitored by the detection ML model. For example, the sampling rate for recording the audio content may be relatively higher than the sampling rate for audio content monitored by the detection ML model. Or, for example, the grain of frequency for recording the audio content may be relatively higher than the few frequency bins of the audio content monitored by the detection ML model. The audio content that is recorded may include a number of time series signals up to a time series signal for each of the set of fine-grained audio frequencies received from the radio. In one embodiment, the audio content is recorded in the buffer as 100 time series signals sampled from the 100 bins of the audio spectrum as discussed above.

The detection of the human voice may also initiate or trigger extraction of the human voice from the background of static noise in the audio content (for example from the recording in the buffer).

In one embodiment, the suspected distress call (the human voice) is converted into text of the call and vocal metrics of the call. The conversion is performed by extracting the suspected distress call from the audio content as discussed below with reference to process block 215, and recognizing speech in the suspected distress call to transform the suspected distress call into text and vocal metrics as discussed below with reference to process block 220.

At process block 215, the method extracts the human voice from the audio content. More particularly, distress call detection and authentication method extracts data that represents the human voice out of the audio content, although this may be referred to herein simply as extracting the human voice from the audio content. To extract the human voice from the audio content, a portion of the audio content that includes the human voice is identified, and then that portion of the audio content is de-noised to reduce or eliminate the background static noise. De-noising enhances the human voice, leading to an improved signal-to-noise ratio for the voice. This prepares the human voice for more accurate speech recognition than if the speech were left embedded in the background static noise of the audio content.

In one embodiment, the portion of audio content covers a range of observations that encompasses the human voice. The portion of audio content that contains the human voice begins at an observation at which the recording (in the buffer) begins, and ends at an observation at which the recording ceases. For example, the portion of the audio content ranges between the observation where the alert indicating detection of human voice occurs, and the observation where the alert indicating cessation of the human voice occurs. The portion of the audio content that contains the human voice is therefore selected by the alerting action of the detection ML model (for example as described in additional detail below with reference to process blocks 435-440 of method 400).

In one embodiment, extraction and denoising is performed as an anomaly detection process. The human voice may be extracted from the audio content using an anomaly detection model. The anomaly detection model is trained to identify audio content other than static noise, such as the human voice, as an anomaly. The audio content that makes up the voice is thus separated or extracted from the non-anomalous background noise by the anomaly detection model. The anomaly detection model, such as extraction ML model 155, is used to extract the human voice from the portion of the audio content and denoise the human voice. The anomaly detection model used for extraction may be in addition to the anomaly detection model used for detection (e.g., detection model 145). The extraction ML model may be multivariate anomaly detection model such as an MSET model. Before performing the extraction and denoising, the extraction ML model is trained to identify human voice as an anomaly in static noise. The extraction ML model is trained using a training database of noise-only time series signals (such as $2^{nd}$ audio content 195). In one embodiment, the training database has noise-only signals corresponding (by frequency bin) to the signals recorded in the buffer.

In one embodiment, the training is done using a large database of recorded historical distress calls, both authentic and hoax, on the emergency maritime radio frequencies. The recordings of historical distress calls may be obtained from government agencies that monitor the emergency radio frequencies, such as from the United States Department of Homeland Security or Coast Guard. The historical distress calls include audio segments that contain radiofrequency noise while no voice is present. For example, the segments of radiofrequency noise without voice may be before or after segments containing voice. One or more segments of radiofrequency noise without voice may be sampled from the historical distress calls to produce the training database of noise-only time series signals. It is assumed that radiofrequency noise in audio content, when broken down into frequency bins and sampled, is similar for the historical distress calls in the past and for the live content on the emergency-band radio frequencies. This assumption is safe because the radio frequencies for the emergency bands generally do not change, and the sampling rates for recording the historical distress calls generally remains consistent for extended periods (for example, years). Training of predictive ML models is described in further detail elsewhere herein, for example with reference to method 400 following discussion of process block 425.

In one embodiment, the human voice may be extracted from the audio content using an anomaly detection model that has been iteratively configured or trained to reduce a word error rate in speech recognition of human voice extracted by the anomaly detection model. The anomaly detection model used for extraction of human voice is iteratively or repeatedly trained using static radiofrequency noise from a training database (such as $2^{nd}$ audio content 195); used to extract speech from historical distress calls in the training database; the extracted speech recognized; and the word error rate determined until the word error rate is satisfactory. Additional detail about iterative training of the ML model for audio extraction is described herein under the heading "Framework—Extracted Voice Optimization" below, and with reference to process blocks 430-445 of method 400.

Once trained, the extraction ML model identifies human voice as an anomaly by predicting a static noise value for each of the time series signals based on the received values for the other time series signals, and comparing the predicted and received values for each signal. The residual values between the predicted and received values for the signals in the time series database represent the human voice without the noise content. The residual values representing the human voice may also be referred to herein as a voice signature. Subtracting out the predicted values—the estimates of expected noise—from the received values to form the residuals has the effect of removing the noise from the audio content, leaving the human voice. In this way, the human voice is extracted from the audio content as residuals between predicted static noise values, and anomalous received human voice values.

The extracted residuals are thus data that represent the human voice. The residuals that represent the human voice may be stored as a set of time series signals of the extracted residual values (also referred to as residual time series signals) that represent a portion of the human voice present in each frequency bin. In one embodiment, representing the human voice indicates producing data of amplitudes attributable to human voice (rather than to noise) at individual positions in time and frequency. The residual time series signals are thus data that represent the human voice as differences in amplitude between predicted noise values and actual (i.e., received) values at specific times and frequency bins. The set of residual time series signals collectively represents the human voice. In one embodiment, the extracted residuals that represent the human voice may be stored as a time series database. The time series database (or other set of residual time series signals) may be provided as the data that represents human voice extracted from the audio content.

The data that represents the human voice that is extracted from the audio content is denoised based on the estimated time series signals. The predicted static noise values approximate the actual noise overlaying the human voice in the audio content. Therefore, the human voice is denoised by subtracting the predicted noise out of the audio content. In one embodiment, the extraction ML model both extracts the residual data that represents the human voice from the audio content and denoises the data that represents the human voice by removing estimated static noise from the audio content. Performing the extraction and denoising as an anomaly detection process enables the extraction and denoising to occur together.

In one embodiment, the steps of process block 215 are performed by human voice detector and extractor 105 (including extraction ML model 155) of distress call detection and authentication system 100. Additional detail on extraction and denoising is provided below with reference to process block 445 of method 400. Process block 215 completes, and distress call detection and authentication method 200 continues at process block 220. At the completion of process block 220, the human voice has been extracted from the audio content in and de-noised. In one embodiment, the human voice is extracted from the audio content using an anomaly detection model that has been iteratively configured to reduce word error rate in speech recognition on voice produced by the model. The human voice is thus prepared for voice recognition.

At process block 220, the method recognizes speech in the human voice to transform the human voice into text and vocal metrics. For example, words (or other segments) spoken by the human voice are automatically identified and transcribed. And, for example, metrics of characteristics of the way the words are spoken (referred to as vocal metrics) are automatically generated and recorded in association with the words. The automatic identification and transcription of words may be performed using one or more AI speech recognition models. The automatic generation of the vocal metrics about words may also be performed using one or more AI speech recognition models. The AI speech recognition models have been trained to generate tokens that represent sounds that appear in the human voice as text of words and metrics about the way the words are spoken. These text tokens may be streamed to a file as they are generated, to produce a file (or other data structure) of the text and accompanying vocal metrics. The produced file includes a transcription of speech made by the human voice.

In one embodiment, the steps of process block 220 are performed by speech recognizer 110 of distress call detection and authentication system 100. Additional detail regarding speech recognition is provided below with reference to process blocks 455-460 of method 400. Process block 220 completes, and distress call detection and authentication method 200 continues at process block 225. At the completion of process block 220, a file or other data structure has been created that includes a text transcript of words spoken by the human voice along with vocal metrics for one or more vocal characteristics of the way individual words were spoken. Thus, the suspected distress call is converted into text of the suspected distress call and vocal metrics of the suspected distress call. The text and vocal metrics are readily analyzable to generate feature scores about what the human voice said.

At process block 225, the method generates a feature scores that represent features of the recognized speech based at least in part on the vocal metrics. For example, the method generates feature scores representing features of the suspected distress call based on the text and vocal metrics. In one embodiment, a feature score is a numeric representation of an extent to which the speech exhibits hoax-like or authentic-like properties for a given feature. A feature of the speech is an aspect of the text of the speech or the manner in which the speech is spoken that can carry subtextual or implied meaning that may not necessarily be expressly stated in the speech. Features about the speech include one or more of tone, inflection, phrasing, and sentiment. In one embodiment, the feature scores generated include at least one of tone, inflection, phrasing, or sentiment. Features of the recognized speech may also include emotions when detected, for example anger, sadness, fear, surprise, and "flatness" of the end-to-end speech (flatness is a feature most often attributed to reading from a script or reciting a pre-memorized script). Other features may also be included. The features are thus a form of metadata about the recognized speech.

In one embodiment, the feature scores are generated by ML regression models. The ML regression models are each configured (by training) to generate a feature score for one type of feature. The ML regression model may determine the feature score based on one or more of the following inputs: the text or portions of the text, lexical analysis results, syntactic analysis results, and/or semantic analysis results. In one embodiment, the ML regression model is trained with a training library of texts of distress calls to estimate a feature score for a text. The texts in the training library are labeled with feature scores. Texts of genuine distress calls are labeled with a first feature score, such as 1.00. Texts of hoax distress calls are labeled with a second feature score, such as 2.00. Once trained, the ML regression model will generate feature scores in the range between the first and second scores (inclusive), with values closer to the first score indicating more genuine properties of the text, and values closer to the second score indicating more hoax-like properties of the text.

Using multiple ML regression models, a feature score may be generated for one or more of the types of features. The ML regression model for a type of feature scores texts of distress calls as hoax-like or genuine distress calls based on the feature. For example, the ML regression model for sentiment distinguishes between distress calls that exhibit hoax-like sentiment and distress calls that exhibit genuine sentiment.

Note that none of these feature scores are predicted from theory (e.g., psychology). The detection and authentication systems and methods described herein are not biased at any stage by theory. Rather, the feature scores are computed empirically during training for a large database of prior recorded distress calls that have been labeled with postevent "ground truth" authentic vs. hoax flags or labels. In one embodiment, during training, the feature scores that were computed for the features are combined in an exhaustive parametric analysis that combines the feature scores into a variety of possible permutations (for example, all possible permutations), to achieve classification of authentic vs. hoax for prior recorded distress calls that satisfies a threshold for satisfactory performance.

Then, for new incoming calls, the empirically learned scores are applied to classify new calls. For new incoming distress calls that are determined to be authentic with a high confidence factor, in one embodiment, that information is provided to humans in the emergency-response centers so they can immediately launch all available rescue resources. In one embodiment, available rescue resources are automatically readied and or launched in response to determining that an incoming distress call is authentic with a confidence factor satisfying a given threshold. For distress calls that are determined to be highly likely to be Hoax calls (based upon extensive analyses with ground-truth historical calls), the humans in the emergency-response centers may be given a set of short "requests for additional information" and may initiate a high-speed reconnaissance resource (surface vessel or air) for a confirmation before actuating a massive rescue response. In one embodiment, in response to determining that a distress call is likely to be a hoax with a confidence factor satisfying a given threshold, the reconnaissance resource may be automatically launched to confirm that the call is a hoax before initiating a rescue response.

In one embodiment, the steps of process block 225 are performed by feature scorer 115 of distress call detection and authentication system 100. Further detail regarding features and feature scoring is described herein with reference to process block 470 of method 400. Process block 225 completes, and distress call detection and authentication method 200 continues at process block 230. At the completion of process block 225, one or more feature scores have been generated that quantify whether the feature shows the speech to be consistent with a hoax distress call or with a genuine distress call. Feature scores representing features of the suspected distress call have been generated based on the text and vocal metrics. In one embodiment, the feature scores generated include at least one of tone or inflection.

The feature scores may be used to classify the human voice distress call as either a hoax distress call or an authentic distress call.

At process block 230, the method classifies the human voice as either a hoax distress call or an authentic distress call based on the feature score. In one embodiment, the classification chooses whether the distress call is authentic or a hoax based on based on one or more feature scores generated in the previous step. A distress call is authentic or genuine where the call reports an actual ongoing emergency. A distress call is a hoax where the call falsely reports an emergency. In one example, the method generates a classification, by a machine learning model, of the suspected distress as either a hoax distress call or an authentic distress call based on the feature scores. The machine learning model is trained based on feature scores from a set of known authentic distress call and a set of known hoax distress calls.

The one or more feature scores may be analyzed to determine whether the human voice is a hoax distress call or a genuine distress call. The analysis may be performed with a ML classifier (such as a support vector machine) machine learning model, such as ML classifier 180. The ML classifier is configured to accept the one or more feature scores as input variables, and generate a classification of the distress call as one of a hoax or authentic. The ML classifier is configured to differentiate between hoax and authentic distress calls based on sequences of feature scores for the input variables. The sequences of feature scores are generated over the course of distress calls. The sequences show the changing values of the feature scores at intervals over the course of the distress call.

The ML classifier is trained to generate the classification based on feature scores for a set of historical distress calls that are labeled as either known to be authentic or known to be a hoax. The labels are based on after-the-fact, ground truth knowledge of whether the distress call was for an actual emergency. Sequences of feature scores for the labeled historical distress calls are used in conjunction with the labels to train the ML classifier to differentiate between authentic and hoax distress calls. The training is completed when the ML classifier has learned to optimally discriminate between hoax and authentic distress calls. The discrimination between hoax and authentic is "optimal" when the ML classifier satisfies a threshold level of accuracy in generating classifications for the historical distress calls that are consistent with the labels of the distress calls. Thus, the ML model is trained based on feature scores from a set of known authentic distress calls and a set of known hoax distress calls.

Once the threshold level of accuracy is satisfied, sequences of feature scores generated for live, incoming (and unlabeled) distress calls may be provided to the trained ML classifier to generate a classification of the incoming distress call as one of authentic or a hoax. Additional detail regarding the ML classifier is discussed below with reference to learned optimal discrimination in block 425.

Alternatively, the one or more feature scores may be compared with a threshold to determine whether the human voice is a hoax distress call or a genuine distress call. For example, the threshold may be established at the midpoint of the range of possible feature scores. Thus, in one embodiment where the range of feature scores extends from 1.00 to 2.00, the threshold between the feature scores of hoax and authentic (genuine) distress calls may be 1.50. Values other than the midpoint may also be used to define the threshold. The threshold for the human voice being a hoax distress call is satisfied where the feature score exceeds 1.50. The threshold for the human voice being an authentic distress call is satisfied where the feature score falls below 1.50. The feature score may thus be compared to the threshold to classify the human voice as authentic or a hoax.

In one embodiment, where feature scores for multiple types of features are generated for a text, the classification may be based on more than one feature score. In one embodiment, the mean of the feature scores may be calculated, and then compared to the threshold to make the classification. For example, the mean of feature scores for tone, inflection, phrasing, and sentiment of a text may be found. The mean of the feature scores may be compared to the threshold (as discussed above) to classify the human voice as genuine or a hoax.

In one embodiment, the steps of process block 230 are performed by authenticity classifier 120 of distress call detection and authentication system 100. Process block 230 then completes, and distress call detection and authentication method 200 continues at process block 235. At the completion of process block 230, the human voice has been classified as one of a genuine distress call or a hoax distress call. In other words, a classification the suspected distress call as either a hoax or authentic has been generated based on the feature scores. This classification may be included in an alert about the distress call in order to provide additional context for responding to the distress call.

At process block 235, the method presents an alert that indicates that the human voice is one of the hoax distress call or the authentic distress call. For example, the method may generate an alert that indicates the classification of the suspected distress call. The alert may state that a distress call is being received. The alert may include a result of the classification from process block 230 to indicate that the human voice is either a hoax distress call or the authentic distress call. In one embodiment, the alert may also include a hoax confidence factor that the human voice is correctly classified as a hoax distress call or an authentic distress call as another indication of the hoax or authentic status of the distress call. In one embodiment, the alert may also include a detection confidence factor that the human voice detected is actually a human voice as still another indication.

In one embodiment, the alert may include the text transcript of any speech by the human voice. A watch stander or other user may view the transcript in the alert as well as hear the human voice. In one embodiment, the extracted, denoised human voice is played over an audio output (such as speaker or headphones) in place of the audio content. This enables the watch stander to hear the distress call without noise.

In one embodiment, the alert is an electronic message. The alert may be presented by generating the alert and transmitting it for subsequent display or other action. The alert may be configured to be displayed in a graphical user interface. The alert may be configured as a request (such as a REST request) used to trigger initiation of some other function.

In one embodiment, the alerting may be performed in a real time (or near real time) response to detection of the human voice. In one embodiment, as used herein "real time" refers to substantially immediate operation, with availability of output subject to a minimal delay acceptable in the context of live voice communications. The alert may be used to attract the attention of a human watch stander to respond to the distress call. The indications in the alert inform the watch stander whether or not to treat the distress call as a hoax or authentic.

In one embodiment, the steps of process block 235 are performed by alert generator 125 of distress call detection and authentication system 100. Additional detail regarding alert generation is provided below with reference to process blocks 485 of method 400. Process block 235 then completes, and processing continues to END block 240, where distress call detection and authentication method 200 completes.

At the completion of method 200, an alert is provided immediately upon detection of a human voice distress call in a background of static noise. In one embodiment, the alert generated indicates the classification of the suspected distress call as one of a hoax distress call or an authentic distress call. The detection of the human voice distress call is performed with high accuracy and without subjectivity. The alert includes a non-subjective classification of the distress call as hoax or genuine. The method rapidly brings a distress call to the attention of a watch stander and informs the split-second decisions for launching emergency response operations. The method thus reduces the chance of missed distress calls and reduces the chance of wasteful emergency response on a hoax. while still permitting rapid launch of emergency response In one embodiment, generating feature scores that represent features of the recognized speech based at least in part on the vocal metrics (as discussed above with reference to process block 225) further generates a feature score for tone or inflection features of the speech. In one embodiment, a feature score for tone or inflection is based at least in part on one or more of the vocal metrics of volume, pitch, or pace of the recognized speech. The feature score for tone or inflection indicates an extent to which the tone or inflection of the human voice is consistent with a genuine distress call. The feature score for tone or inflection is one of the feature scores mentioned at process block 225 (that is, the feature scores include the feature score for tone or inflection). Additional detail on generating feature scores for tone or inflection is provided below with reference to process block 470.

In one embodiment, generating feature scores that represent features of the recognized speech (as discussed above with reference to process block 225) further generates a feature score for phrasing or sentiment of the speech. In one embodiment, a feature score for phrasing or sentiment is generated based on one or more words or the arrangement of words in the text of the recognized speech. The feature score for phrasing or sentiment indicates an extent to which the phrasing or sentiment in the text of the recognized speech is consistent with a genuine distress call. The feature score for phrasing or sentiment is one of the feature scores mentioned at process block 225 (that is, the feature scores include the feature score for phrasing or sentiment). Additional detail on generating feature scores for phrasing or sentiment is provided below with reference to process block 470.

In one embodiment, following process block 230, the method also generates a hoax confidence factor. A residual surface is generated from the audio content that includes the human voice and second audio content that does not include human voice. A first weight is applied to residuals of the residual surface in response to the classification of the human voice as the hoax distress call. A second weight is applied to the residuals of the residual surface in response to the classification of the human voice as the authentic distress call. A cumulative mean absolute error (CMAE) is determined from the residual surface. A hoax confidence factor that the human voice extracted is correctly classified as a hoax is then also included in the alert. The hoax confidence factor is based on the cumulative mean absolute error. In one embodiment, generating the hoax confidence factor includes generating residuals between first audio of the suspected distress call and second audio that contains radio frequency noise and does not contain a distress call. The residuals are weighted with a first weight where the suspected distress call is classified as a hoax. The residuals are weighted with a second weight where the suspected distress call is classified as authentic. A hoax confidence factor that the classification is correct is then generated based on the weighted residual. Additional detail on the hoax confidence factor is described herein with reference to process block 475 of method 400.

In one embodiment, following process block 230, the method also generates a detection confidence factor. A residual surface is generated the audio content that includes the human voice and additional audio content that does not include human voice. A cumulative mean absolute error (CMAE) is determined from the residual surface. A detection confidence factor that the human voice detected is actually a human voice is then also included in the alert. The detection confidence factor is based on the cumulative mean absolute error. In one embodiment, generating the detection confidence factor includes generating residuals between first audio of the suspected distress call and second audio that contains radio frequency noise and does not contain a distress call. A detection confidence factor that the suspected distress call was correctly detected is generated based on the residuals. Additional detail on the detection confidence factor is described herein with reference to process block 475 of method 400.

In one embodiment, the feature score discussed above with reference to process block 225 represents at least one of tone, inflection, phrasing, or sentiment metadata about the text of the recognized speech. Additional detail about these features and scoring is described herein with reference to process blocks 470-475 of method 400.

In one embodiment, generating feature scores representing features of the suspected distress call based on the text and vocal metrics (as discussed at process block 225 above) includes generating feature scores for tone, inflection, phrasing, and sentiment. A feature score for tone is generated based at least in part on a vocal metric of pitch for the suspected distress call. A feature score for inflection is generated based at least in part on a vocal metric of volume for the suspected distress call. A feature score for phrasing is generated based at least in part on analysis of a sequence of words in the suspected distress call. A feature score for sentiment is generated based at least in part on an extent to which an emotion is conveyed in the suspected distress call.

In one embodiment, generating feature scores that represent features of the recognized speech based at least in part on the vocal metrics (as discussed at process block 225 above) includes generating a feature score for tone or inflection. The feature score for tone or inflection is generated based at least in part on one or more of vocal metrics of volume, pitch, or pace for the recognized speech. The feature score for tone or inflection indicates an extent to which the tone or inflection of the human voice is consistent with a genuine distress call. The feature score for tone or inflection is one of the feature scores discussed in process block 225.

In one embodiment, generating feature scores that represent features of the recognized speech based at least in part on the vocal metrics (as discussed at process block 225 above) includes generating a feature score for phrasing or sentiment. The feature score for phrasing or sentiment is generated based on one or more of words or the arrangement of words in the text of the recognized speech. The feature score for phrasing or sentiment indicates an extent to which the phrasing or sentiment in the text of the recognized speech is consistent with a genuine distress call. The feature score for phrasing or sentiment is one of the feature scores discussed in process block 225.

In one embodiment of process block 210, the detection of the human voice in the audio content of the radio signal may include dividing a spectrum of the audio content into a set of frequency bins. A subset of the frequency bins that are most likely to include human voice distress calls is then selected. The human voice is then detected in the subset of the frequency bins with a detection machine learning model that has been trained to identify human voice in the subset of frequency bins as an anomaly.

In one embodiment of process block 210, when receiving a suspected distress call in audio format, the method may also include selecting a subset of frequency bins that are most likely to include human voice distress calls. The suspected distress call is detected in the subset of the frequency bins. Recording the suspected distress call is begun in response to detecting the human voice in the subset of frequency bins. Additional detail about detection of the human voice or suspected distress call is described herein with reference to process blocks 415-440 (voice detection process 450) of method 400.

In one embodiment of process block 215, the extraction of the human voice from the audio content may include, in response to detecting the human voice, beginning to record the audio content. Then, in response to detecting that the human voice has ceased in the audio content for a predetermined amount of time, recording the audio content is ended. The human voice is then extracted from the audio content with an extraction machine learning model that has been trained to identify human voice in the audio content as an anomaly. Additional detail about recording and extraction of the human voice is described herein with reference to process blocks 435-445 of method 400.

In one embodiment of process block 215, the extraction of the human voice from the audio content may include dividing a spectrum of the audio content into a set of frequency bins. A time series signal is generated from each bin in the set of frequency bins to produce a set of time series signals. An estimated time series signal is generated for each time series signal based on the other time series signals in the set of time series signals. Residuals are generated between each time series signal in the set of time series signals and the estimated time series signal estimated for the time series signal to produce a set of residual time series signals. The set of residual time series signals is provided as the data that represents the human voice extracted from the audio content. The data that represents the human voice extracted from the audio content is denoised based on the estimated time series signals.

In another embodiment of process block 215, the sets of time series signals are time series databases. Thus, the extraction of the human voice from the audio content may include dividing a spectrum of the audio content into a set of frequency bins. A time series signal is generated from each bin in the set of frequency bins to produce a time series database of the audio content. An estimated time series signal is generated for each time series signal based on the other time series signals in the time series database to produce a time series database of estimates. The estimated time series signals are generated by a machine learning model trained to identify human voice as an anomaly in noise. Residuals are generated between the time series database of the audio content and the time series database of the estimates to produce a time series database of residuals. The time series database of residuals is then provided as the data that represents the human voice extracted from the audio content. Additional detail about the extraction of the human voice is described herein with reference to process blocks 420-445 of method 400.

In one embodiment, before detecting the human voice as the anomaly in the audio content as discussed in process block 210, the method 200 also trains a machine learning model with audio noise to identify human voice as an anomaly in noise. The human voice is then detected as the anomaly in the audio content with the trained machine learning model. Additional detail about training machine learning models for detection (or for extraction) of human voice as an anomaly is described herein with reference to process blocks 430-445 of method 400.

In one embodiment, before converting the suspected distress call (or human voice) into text (for example as discussed above in process block 210), the method 200 also iteratively trains a machine learning model (such as multivariate anomaly detection model) with audio noise to identify human voice as an anomaly in noise. In one embodiment, the training iterates until a threshold is satisfied for a word error rate of text converted from audio extracted as the anomaly. In one embodiment, the training iterates until a threshold is satisfied for a word error rate of text recognized from the data that represents the human voice extracted as the anomaly from the audio content. Once the threshold is satisfied, the method extracts data representing the suspected distress call from audio content by detecting the suspected distress call as an anomaly in the audio content using the trained machine learning model. Additional detail about iterative training of the ML model for audio extraction based on WER is described herein under the heading "Framework—Extracted Voice Optimization" below, and with reference to process blocks 430-445 of method 400.

In one embodiment, in response to classification of the suspected distress call to be the authentic distress call, the alert causes initiation of a rescue. For example, the alert may be presented to a watch-stander or other user in a graphical user interface that includes an option to automatically dispatch rescue resources to respond to the distress call. The option may be user-selectable, and upon selection, launch, authorize or dispatch land, sea, or air rescue resources. In response to selection of the user-selectable option, a message may be generated and transmitted to the rescue resources directing them to conduct a rescue operation to resolve the emergency indicated by the distress call. In one embodiment, the method may extract location information from the distress call. The location may be presented in the alert, and may be transmitted in the message to provide the rescue resources with a destination at which to conduct the rescue operation. Alternatively, in response to classification of the suspected distress call to be the hoax distress call, the alert causes initiation of a reconnaissance operation to the location to confirm that the call is a hoax.

In one embodiment, the detection and extraction machine learning models are multivariate machine learning models used for anomaly detection, such as a multivariate state estimation technique (MSET) models.

—Confidence Factor Generation—

In one embodiment, following classification of the human voice as either a hoax distress call or an authentic distress call as discussed above with reference to process block 230, the method also generates a hoax confidence factor that the human voice extracted is correctly classified as a hoax. A residual surface is generated from the audio content that includes the human voice and additional audio content that does not include human voice. The additional audio content includes static noise only. In one embodiment, the additional audio content may be audio content used to train an ML model to identify human voice as an anomaly, such as extraction ML model 155.

A residual is the absolute value of the difference between two values having a time series index in common. The residual surface is made up of residuals between the amplitude values in time series signals of a time series database for the audio content and the amplitude values in time series signals in of a time series database for the additional audio content. The residuals are taken between the values of time series signals for corresponding audio frequencies (such as frequencies having equal wavelengths) in the time series databases for the audio content and the additional audio content. The residual surface may be stored as a time series database of time series signals of residual values.

Following generation of the residual surface, a first weight is applied to residuals of the residual surface in response to the classification of the human voice as the hoax distress call, or a second weight is applied to the residuals of the residual surface in response to the classification of the human voice as the authentic distress call. This produces a weighted residual surface. For example, a weight may be applied to the residuals by multiplying the residuals by the weight. The weight may be scaled between a value of 1.00 for authentic and 2.00 for hoax distress calls. The first weight, applied to the residuals when a distress call is determined to be a hoax, may be a larger weight nearer the value of two, causing the value of the residual to significantly increase. The second weight, applied to the residuals when a distress call is determined to be authentic, may be a smaller weight nearer the value of one, causing little or no change to the value of the residual.

The weight may be specific to an individual feature. Where additional features are scored and used to classify the human voice as either a hoax distress call or an authentic distress call, weights in the range from 1.00 (authentic) through 2.00 (hoax) may be additionally applied to the residuals. Thus, where multiple features have scores that indicate that the human voice is consistent with a library of distress calls that proved to be hoaxes, the residuals are greatly amplified by the weighting. Where multiple features have scores that indicate that the human voice is consistent with past authentic distress calls, the residuals are little amplified by the weighting. Further detail on weighting for multiple features is described below with reference to process block 375 of method 300 (where the scores for multiple features are referred to as "sub-scores").

Once the residuals of the residual surface have been weighted, a cumulative mean absolute error (CMAE) is determined from the weighted residual surface. A mean absolute error (MAE) is determined for each time series signal of residual values in the residual surface. A residual may also be referred to as an absolute error. Therefore, the MAE is the mean residual value for a time series signal of residual values. Thus, for each frequency represented in the residual surface, an average is found for the residual values in the time series signal for that frequency. A CMAE is the sum of the MAEs for the time series signal of residual values in the residual surface. Therefore, the sum of the MAEs for the time series signals in the weighted residual surface is calculated to find the CMAE for the weighted residual surface.

Once the CMAE for the weighted residual surface is found, a hoax confidence factor is included in the alert. The hoax confidence factor indicates an extent of confidence that the human voice is correctly classified as a hoax. For example, the hoax confidence factor indicates a level or extent of confidence that a human voice distress call should be classified as a hoax. The hoax confidence factor is based on the cumulative mean absolute error (CMAE). In one embodiment, the hoax confidence factor may be the value of CMAE itself. Or, the hoax confidence factor may be the CMAE normalized for the number of frequencies or signals included in the weighted residual surface. For example, the CMAE may be normalized for the number of time series signals in the weighted residual surface by dividing the CMAE by the number of time series signals in the weighted residual surface. The hoax confidence factor is then written into the electronic message used to deliver the alert, for example as discussed above with reference to process block 235.

The weighting of the residuals discussed above amplifies the CMAE, allowing for a broader range between lower hoax confidence factor values indicating a high likelihood of authenticity, and higher hoax confidence factor values indicating a high likelihood that a distress call is a hoax. With each feature score that indicates the distress call to be a hoax, the CMAE is amplified, providing a clear distinction in the hoax confidence factor between apparent hoax distress calls and authentic distress calls.

In one embodiment, following detection of the human voice as an anomaly in the audio content as discussed above with reference to process block 210, the method also generates a detection confidence factor that the human voice detected is actually a human voice. Generation of the detection confidence factor is similar to the generation of the hoax confidence factor as discussed above, but does not include weighting of residuals based on classification of the human voice distress call as a hoax or authentic.

As discussed above with reference to generation of the hoax confidence factor, a residual surface is generated from the audio content that includes the human voice and additional audio content that does not include human voice (and which does include static noise). A CMAE is then determined from the residual surface. To calculate the CMAE, a mean residual value (or MAE) is determined for each time series of residuals that make up the residual surface. Then, the sum of the MAEs for each time series is determined in order to generate the CMAE. Once the CMAE for the residual surface is determined, a detection confidence factor that the human voice detected is actually a human voice is Included in the alert. The detection confidence factor is based on the cumulative mean absolute error (CMAE). In one embodiment, the detection confidence factor may be the value of the CMAE itself. In one embodiment, the detection confidence factor may be the CMAE normalized for the number of signals in the residual surface. For example, the CMAE may be normalized for the number of time series signals in the residual surface by dividing the CMAE by the number of time series signals in the residual surface. The detection confidence factor is then written into the electronic message used to deliver the alert, for example as discussed above with reference to process block 235.

In one embodiment, both the detection confidence factor and the hoax confidence factor may be included in the alert. In one embodiment, neither the detection confidence factor nor the hoax confidence factor is included in the alert. In one embodiment, the detection confidence factor is included in the alert, and the hoax confidence factor is not included. In one embodiment, the hoax confidence factor is included in the alert, and the detection confidence factor is not included.

—Autonomous Distress Call Detection, Characterization, and Authentication—

There is a need for an artificial intelligence (AI), machine learning (ML) based means to "listen" to radiofrequency (RF) channels to detect human distress calls, and, upon detection, to be able to discriminate authentic emergency distress calls from hoax calls. Tremendous emergency response operations have been performed in response to distress calls only to discover in too many cases that the call was a hoax.

Systems, methods, and other embodiments are described herein that provide a novel framework for autonomous emergency distress-call detection, characterization, and authentication. The framework enables autonomous, computerized distress call detection and authentication. In one embodiment, computerized distress call detection and authentication systems and methods shown and described herein eliminate the need for rooms full of human "watchstanders" to have to listen to squawking radio static with their ears 24×7 to detect humans talking amid all the radio frequency (RF) noise in the audio signal. In one embodiment, the computerized distress call detection and authentication systems and methods employ an innovative "frequency-domain to time-domain" transformation of fine-grain audio frequencies to turn those audio frequencies into time series signals. The time series signals may be analyzed with predictive ML models (such as MSET, including Oracle's MSET2) to automatically detect and extract human voice(s). The extracted human voice may then be processed with a cloud-based speech to JavaScript Object Notation (JSON) to Digital CSV processing sequence to generate a text transcript of the human voice. The text is then processed with a Natural Language Processing (NLP) algorithm (such as an Oracle Machine-Learning Research Group (MLRG) NLP algorithm) for quantitative scoring of features such as tone, inflection, phrasing, or sentiment, and, when detected, emotion scores such as for anger, sadness, fear, surprise, and "flatness" (most often attributed to reading from a script or reciting a pre-memorized script) of the end-to-end speech. Authentic distress calls are discriminated from hoax distress calls based on scores for one or more of these features. Further, based on the scores for these features, quantitative confidence factors may be provided with the decisions. The new inventive framework is trained against a library of past emergency distress calls that are labeled as "Authentic" or "Hoax" distress calls.

In one embodiment, distress call detection and authentication systems and methods described herein includes training and application of various ML models for detection of incoming calls based on historical authentic and hoax distress calls. Voice detection uses a multivariate anomaly detection model (such as an MSET model) for voice detection to autonomously discriminate human voice from chaotic background radio frequency noise based on training the anomaly detection model to expect background radio frequency noise (for example as described with reference to blocks 210 and 450 herein). The human voice sequence is extracted or stripped out of the background radio frequency noise and enhanced with a multivariate anomaly detection model (such as an MSET model) for voice extraction by detecting the human voice as an anomaly in expected noise (for example as described with reference to blocks 215 and 445 herein).

The extracted human voice is fed into an artificial intelligence speech recognition program to parse into a digitized file (for example, a CSV file of tokens) of the speech made by the human voice (for example as described with reference to blocks 220 and 455-460). In one embodiment, the digitized file includes both text of words spoken by the human voice as well as vocal metrics providing information about the way the words were spoken (for example, about the volume, pitch, pace, etc. of the speech). A nested-loop optimization iteratively optimizes the ML model for voice extraction against the word error rate of speech recognition to reduce word errors in speech recognition performed on human voice extracted using the (for example as described herein under the heading "Framework—Extracted Voice Optimization" below).

Natural language processing is performed to get information about the text of the speech (as described with reference to process blocks 220 and 465). The information about the speech and/or the vocal metrics are provided to ML models to compute feature scores for tone, phrasing, inflection, and/or sentiment (for example as described with reference to blocks 225 and 470). The feature scores are used to automatically classify distress calls as either authentic or hoax with a quantitative confidence factor based on a three-dimensional classification and discrimination analytic (for example at described with reference to blocks 235 and 475).

At a high level, the framework for autonomous emergency distress-call detection, characterization, and authentication includes anomaly detection in the audio spectrum of a radio signal, voice detection in the anomalies, extraction and enhancement of detected voice, extracted voice optimization, Tone/Inflection/Phrasing/Sentiment/Emotion feature scoring, and authentic/hoax classification. Each of these aspects of the framework are described in further detail herein.

—Framework—Anomaly Detection in the Audio Spectrum of a Radio Signal—

Figure 3:
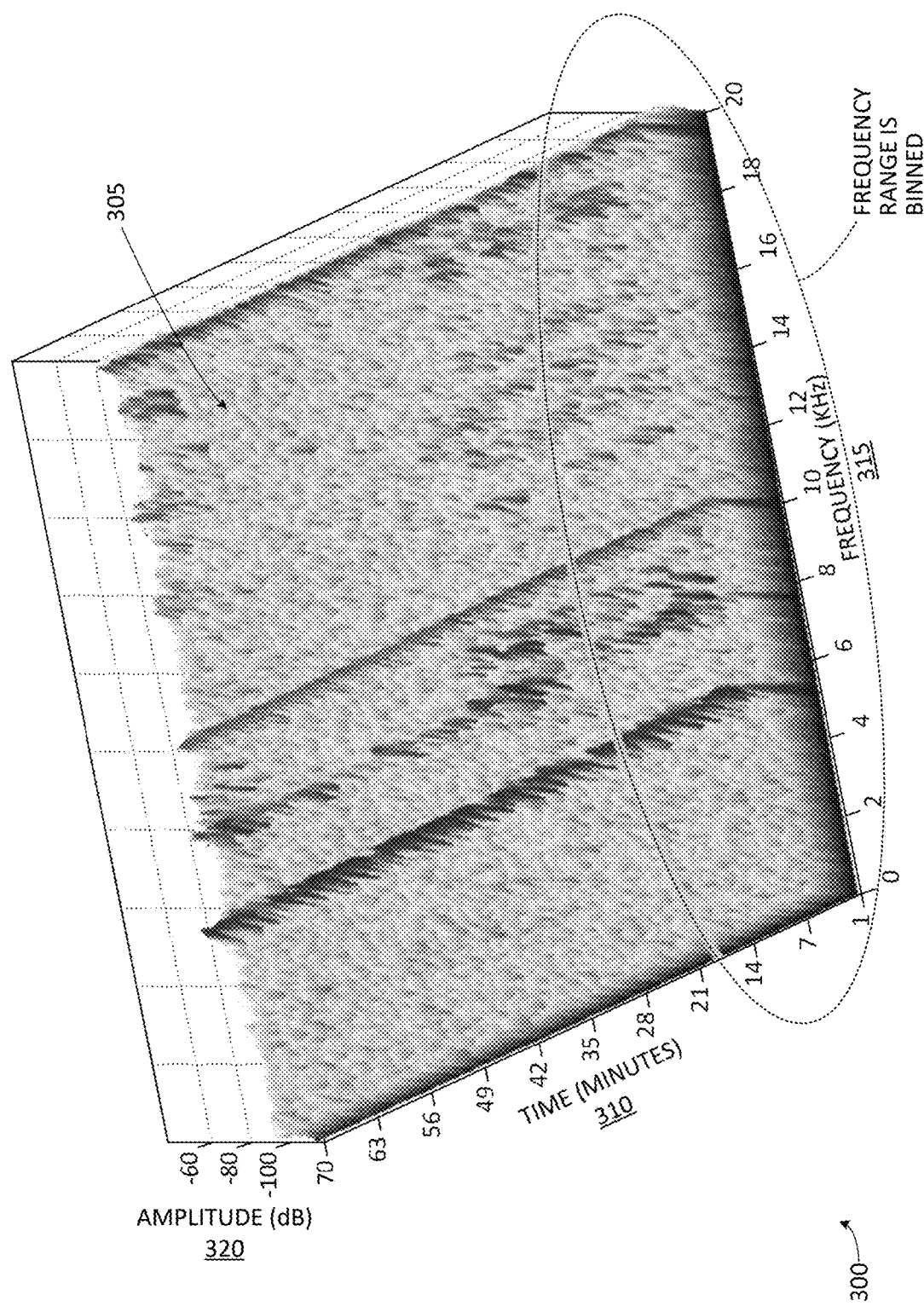
FIG. 3 illustrates an example radiofrequency spectrogram associated with autonomous emergency distress-call detection, characterization, and authentication.

In one embodiment, the system monitors an audio spectrum of audio content of a radio signal, and divides that spectrum into bins on the frequency axis as shown in FIG. 3. FIG. 3 shows a three-dimensional plot 300 of example audio spectrum amplitudes 305. Audio spectrum amplitudes 305 are plotted as a three-dimensional surface against time axis 310, frequency axis 315, and amplitude axis 320. Example audio spectrum amplitudes 305 represents the audio content of an example radio frequency recorded for 70 minutes. The audio content includes static noise, and may also include human voice. The frequencies are initially recorded at a fine-grained resolution, for example a resolution native to the radio or spectrum analyzer producing the frequencies.

These fine-grained frequencies are gathered first into coarse bins. The coarse bins are contiguous subdivisions of the frequency range of the audio spectrum that cover multiple fine-grained frequencies. In one embodiment, the frequency range of the audio spectrum may be subdivided into 100 coarse bins. In FIG. 3, the division of the spectrum into coarse bins would be represented along frequency axis 315. For example, each of 100 coarse bins would cover a range of approximately 200 Hz each along frequency axis 315. Within each of these 100 coarse bins, 200 fine-grained frequencies are selected to analyze in each coarse bin. In one embodiment, the fine-grained frequencies are in 1-Hz increments.

Then, for each of those coarse bins, the coarse bin is turned into an individual time series signal for the coarse bin. For example, an amplitude of the bin may be sampled at an interval to generate an individual time series signal for the bin. Multiple bins may be sampled at the interval to produce a set of correlated time series signals such as a time series database for the multiple bins.

Note that in one embodiment, these compute intensive operations-anomaly detection involved in frequency-domain to time-domain transformation and optimal "binning" of the frequency domain into individual correlated time series that are consumed by MSET—may be optimized for computation on a specific destination computing system (such as Oracle's Roving Edge Device (RED)) configured for monitoring RF signals. This optimization ensures sufficiently high throughput and sufficiently low latency needed for emergency response applications.

—Framework—Voice Detection in the Anomalies—

In one embodiment, the system performs MSET-based voice detection to autonomously discriminate human voice from chaotic background RF noise. The individual time series signals for the bins may be provided to a Multivariate State Estimation Technique (MSET) algorithm. The MSET algorithm detects "anomalies" in multivariate noise, but in this case the "anomalies" are human distress calls. Additional detail describing anomaly detection in the audio spectrum is described herein with reference to process block 210 above and process blocks 415-440 (voice detection process 450) below.

—Framework—Extraction and Enhancement of Detected Voice—

In one embodiment, the system strips out and enhances the human voice sequence to feed into an artificial intelligence (AI) speech recognition algorithm (such as the AI_Speech algorithm available in Oracle Cloud Infrastructure (OCI) Speech Recognition toolkit) to parse into a digitized Comma Separated Value (CSV) file or stream. Additional detail describing extraction and enhancement of detected voice is described herein with reference to process block 215 above and process block 445 below.

—Framework—Extracted Voice Optimization—

In one embodiment, the system performs a nested-loop optimization that iteratively optimizes "Voice Enhancement" from MSET vs. a Word-Error-Rate (WER). WER is the ratio of errors in a transcript to the total words spoken. A lower WER in speech-to-text means better accuracy in recognizing speech. For example, a 2% WER means the transcript is 98% accurate. If one reads a paragraph out loud that has X number of words, and a speech recognition system outputs a string of text, there may be some misspellings that are substituted. These are referred to a substitution errors (S). The speech recognition system may also insert words that were not said. These are referred to as insertion errors (I). And, some words are deleted and not picked up. These are referred to as deletion errors (D). The WER is defined to be the sum of the numbers of substitution errors (S), insertion errors (I), and deletion errors (D), divided by the number of words spoken (X), or $WER=(S+I+D)/X$.

Extracted voice optimization in this invention uses a large collection of speech-to-text files for which the spoken text is known a-priori and treated as "ground truth". For the iterative Voice Enhancement, MSET estimates of the individual fine grain frequency bins are used instead of the raw recorded frequency bins. The MSET estimates have been de-noised by virtue of the fact that each of the (nominally 200) fine-frequency bins is estimated based on the learned correlation of the fine bin with the other 199 fine bins in that coarse bin. The MSET-estimated fine bins have less noise and distortion, and produce a lower WER when the extracted voice optimization algorithm is trained across a large collection of files having known ground truth content.

In one embodiment, to optimize the extracted voice, the MSET model is trained for a selected number of observations of random radiofrequency noise from a training set. The training set is a time series database of random radio frequency noise sampled from the historical distress calls. The trained MSET model is then used to extract voice from one or more historical distress calls by generating the extracted voice as residuals between raw recorded frequency bins of the historical distress calls and MSET estimates of static radiofrequency noise in those frequency bins (for example as discussed above with reference to process blocks 215 and 445). The extracted voice is provided to a speech recognition algorithm to produce a text transcript of the extracted voice. The text transcript is compared with the known, ground-truth spoken text that is recorded along with the historical distress call in the database. The WER is calculated between the text transcript and the ground truth text. If the WER satisfies a threshold for satisfactory accuracy (e.g., less than 0.1%), training of the MSET model is complete. If the WER does not satisfy the threshold for satisfactory accuracy, the process for optimizing the extracted voice is repeated.

—Framework—Tone/Inflection/Phrasing/Sentiment/Emotion Feature Scoring—

In one embodiment, the system applies a natural language processing (NLP) algorithm to the digitized CSV from the extracted and enhanced voice sequence in order to compute scores for tone, inflection, phrasing, and sentiment features, and, when detected, for emotions such as anger, sadness, fear, surprise, and "flatness" (most often attributed to reading from a script or reciting a pre-memorized script) of the end-to-end digitized CSV text. Additional detail describing feature scoring is described herein with reference to process block 225 above and process block 470 below.

—Framework—Authentic/Hoax Classification—

In one embodiment, the system applies a 3D classification/discrimination analytic to decide whether a distress call is an authentic distress call or a hoax distress call with a quantitative confidence factor. Additional detail describing classification of a voice distress call as authentic or a hoax is described herein for example with reference to process block 230 above and process block 475 below, and under the heading "Confidence Factor Generation" above.

Example Method

Figure 4:
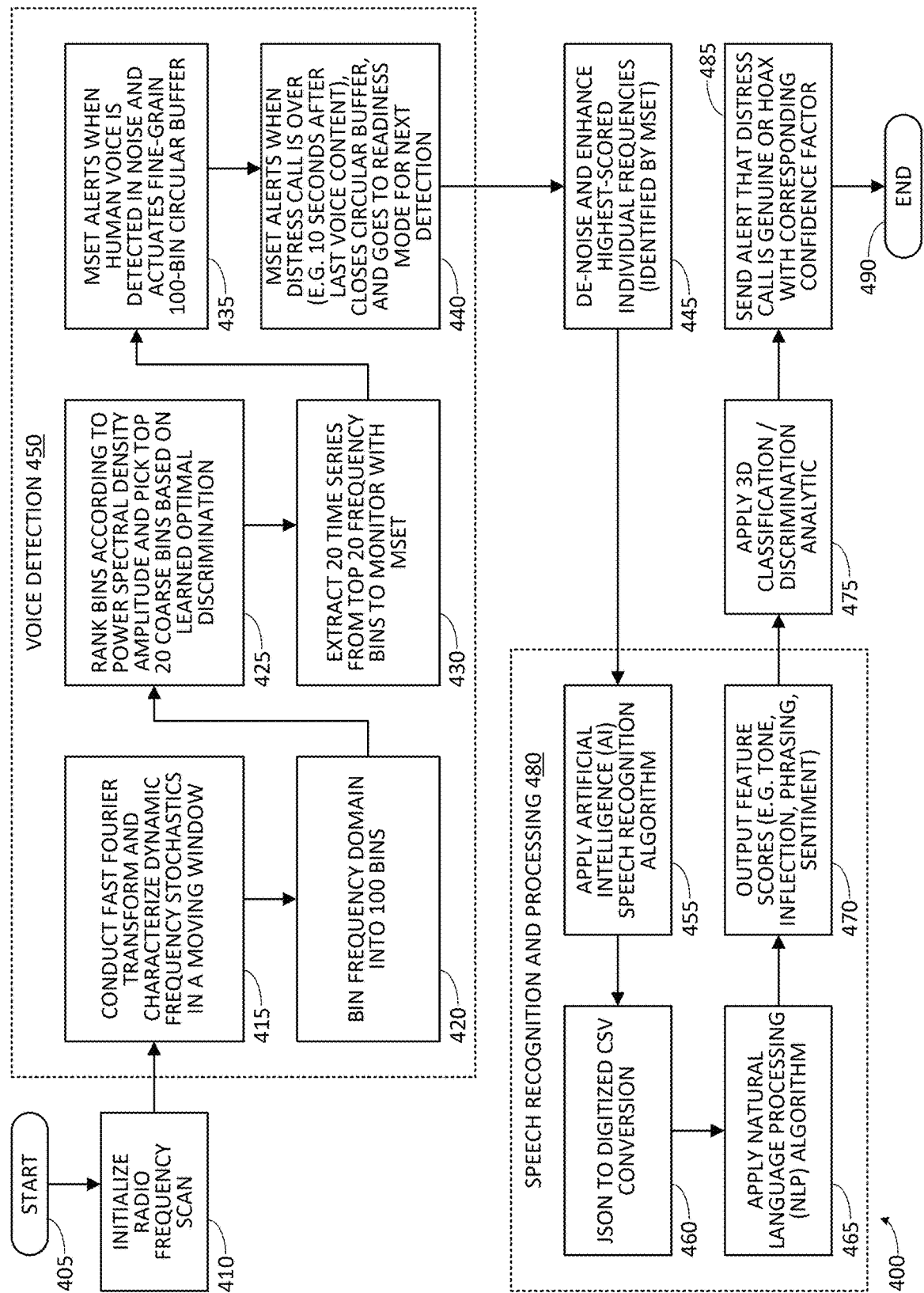
FIG. 4 illustrates one embodiment of a method associated with autonomous emergency distress-call detection, characterization, and authentication.

FIG. 4 shows one example method 400 associated with computerized distress call detection and authentication. The method 400 may be initiated or launched automatically based on various triggers, such as in response to receiving a signal over a network or parsing stored data indicating that (i) audio content of a radio signal has been or is being received; (ii) a user or administrator of the system has initiated or launched method 400; (iii) it is currently a time at which method 400 is scheduled to be run or launched; (iv) human voice is present in audio content of a radio signal; or (v) another trigger for initiating or launching method 400 has occurred. The method 400 initiates at START block 405 in response to parsing a signal received or stored data retrieved and determining that the signal or stored data indicates that the method 400 should begin. Processing continues to process block 410.

At process block 410, the processor initializes radio frequency (RF) scanning. In one embodiment, the accesses a stream of audio spectrum values (amplitude value by frequency at a unit of time) translated from a radio signal by a radio receiver, for example, a software defined radio. As discussed above, the radio receiver receives the radio signal on a distress frequency. For example, the radio signal may be carried on marine VHF frequency Channel 16 (156.8 MHz), or carried on 2182 kHz, which have both been designated by international agreement to be distress frequencies. The radio signal may also be carried on other frequencies, including other international, national, and local distress frequencies.

Also as discussed above, the radio receiver translates the radio signal into audio content. The radio may include or be connected to a spectrum analyzer that produces amplitude values by frequency from analog audio content. The audio content may be described by the stream of audio spectrum amplitude values, for example generated by the spectrum analyzer. The stream of audio spectrum amplitude values may be gathered as time series into a time series database of fine-grained audio frequencies. As used herein, the term "fine-grained" refers to a native or pre-set resolution of frequencies produced by the radio (or spectrum analyzer) used to produce the time series database. The spectrum analyzer converts the analog audio content received from the radio to a time series database. The audio spectrum values may be provided directly from the radio, or from a data service that received the audio spectrum values from the radio.

Processing at process block 410 completes and processing continues at process block 415. Note that processing in blocks of method 400 may be performed for a stream of incoming values. Where processing completes for some values and proceeds to a subsequent block, processing may continue at a block for other values later in the stream. For example, process block 410 continues to stream audio spectrum values translated from the RF signals until streaming is terminated, and process block 415 reiterates for subsequent groups of streamed values.

At process block 415, the processor conducts a fast Fourier transform (FFT) and characterizes dynamic frequency-stochastics in a moving window. The moving window accommodates the streaming values. The FFT is performed for the window once enough streaming audio spectrum values to fill the window have arrived. The window may be overlapping or non-overlapping. The FFT breaks out the energy vs. frequency content of the signal, and yields a power spectral density showing the power of the signal by frequency range. Human voice is not a monofrequency sound, but an envelope of harmonics, each of which produces a "peak" on the moving window FFT output. The highest peaks in the FFT output indicate the audio frequencies that are harmonics of human voice. Processing at process block 415 completes and processing continues at process block 420.

At process block 420, the processor bins or subdivides the frequency domain into 100 coarse bins. For example, the audio spectrum is subdivided into 100 coarse frequency bins of similar size. For example, a first bin may include fine individual frequencies from 1 to 200 Hz, a second bin may include frequencies from 201 to 400 Hz, and so on through the breadth of the audio spectrum. Processing at process block 420 completes and processing continues at process block 425.

At process block 425, the processor ranks the bins according to the amplitude of the respective power spectral densities (PSD) of the coarse bins. The processor then selects the top coarse bins, for example, the top 20 bins. The top coarse bins are to be monitored to detect human voice in the audio content. The top bins may be selected based on PSD of the bins for authentic distress calls that were previously recorded. The previously recorded authentic distress calls may be labeled as authentic based on after-the-fact, ground truth knowledge, or based on learned optimal discrimination (discussed below) between authentic and hoax calls. From the authentic distress calls, the top coarse bins in which the content of authentic distress calls most often occurs are identified by height of PSD peak.

The PSD of random noise is low. Where there is nonrandom sound, there is a peak in the PSD that stands up above the noise components. Because human voice is a group of frequencies, peaks representing voice may show up in multiple frequency bins. The coarse bins to monitor for human voice distress calls are those in which the highest PSD peaks most often occur in authentic distress calls. Authentic distress calls that were recorded in the past are analyzed to determine a set of coarse bins that most often include the highest PSD peaks. From the authentic distress calls, the bins that are most likely have high PSD peaks are those that are most likely to carry human voice in an authentic distress call. The PSD peak heights for the bins are analyzed over the historical recorded distress calls to identify the bins that most often included non-random (i.e., non-noise) sound.

To identify the coarse bins that most often include the highest PSD peaks—and therefore most often include voice—the analysis divides the frequency spectrum of the authentic distress calls into coarse bins, generates PSD values for the bins, ranks the bins in order of average PSD value over the authentic distress calls, and selects the top bins with highest average PSD value. For example, the audio spectrum of the authentic distress calls is subdivided into the 100 coarse bins (covering similar frequency ranges). In one embodiment, the voice content of the authentic distress call is extracted from the noisy background by a multivariate predictive ML model. The extraction of the voice content of the historical distress call with the predictive ML model may be performed in a manner similar to that described in detail below with reference to process block 445.

A Fourier transform (such as an FFT) is then performed on the coarse bins to generate power spectral density (PSD) values for each of the 100 coarse bins. For example, the PSD value for a bin is the maximum value of the PSD curve for the bin. Voice content may be extracted and PSD values may be generated for one or more authentic distress calls. PSD value for each bin is averaged for the bin over the one or more distress calls. The 100 coarse bins are then ranked in order of average PSD value. A subset of the coarse bins with the highest average PSD value are selected for monitoring to detect human voice, for example, the top 20 bins. This technique selects for monitoring those bins that have the most voice, and rejects those bins that are most random. Thus, the top 20 coarse bins by PSD value among those coarse bins that are most likely to include voice content from a genuine distress call are selected for monitoring, based on past or historical distress calls that are confirmed to be genuine.

Authentic distress calls that have already occurred may be determined to be authentic in two different ways: (i) the authentic distress call may be labeled authentic based on after-the-fact, ground truth knowledge that the distress call was indicating or requesting aid for an actual ongoing emergency; and (ii) the authentic distress call may be labeled authentic based on learned optimal discrimination by a machine learning model, without reference to ground truth knowledge. The authentic distress calls labeled based on ground truth knowledge may be included in a training library of historical authentic distress calls. The authentic distress calls labeled based on learned optimal discrimination are collected in an ongoing process by the distress call detection and authentication system. This increases the body of authentic distress calls available for identifying the bins most likely to include voice content (or for other training).

Learned optimal discrimination refers to ML model generation of determination that a distress call is authentic or a hoax based on sequences of feature scores derived from the distress call (for example as discussed below). Sequences of feature scores may be determined for various features of a historical distress call recorded in the training library of past distress calls. The sequence indicates how the feature changes over the course of the distress call. The sequence of scores for an individual feature is a sequence of values between a value indicating the maximum of a feature (e.g., 2), and a value indicating the minimum of a feature (e.g., 1). For example, a feature of the emotion anger might be scaled from 1=not angry to 2=very angry. After the feature score sequences are obtained for each recorded distress call in the training library of recorded past distress calls, a ML classification algorithm such as a support vector machine (SVM) builds or learns an "optimal learned discrimination" model from all the labeled sets of feature scores. Once the discrimination model is built, it can be used to accurately assign labels of authentic or hoax to a distress call based on feature score sequences derived from the distress call. (In one embodiment, the ML classification algorithm is executed by ML classifier 180.)

Now if any past call from the library of calls used for training is "replayed", the SVM will accurately assign an authentic or hoax label to it. Also, any new calls that are analyzed by distress call detection and authentication system will produce a sequence of feature scores, which when given to the trained SVM, will be assigned an "optimal discrimination" outcome of authentic or hoax. In one embodiment, the determinations are optimal, having a high confidence factor. For example, a confidence factor in the determination may be 99.9% likely that it really is an authentic call—in which case rescue resources will be immediately launched—or 99.9% likely it is a hoax call—in which case it will be more prudent to dispatch a fastest possible reconnaissance resource to substantiate or refute that an incident really exists before launching a full-force rescue operation.

This selection of the audio frequency bins in which genuine distress calls are most likely to occur may also be performed as an initial configuration step prior to the performance of method 200 above. Processing at process block 425 completes and processing continues at process block 430.

At process block 430, the processor extracts 20 time series signals from the top 20 coarse bins selected in process block 425 above. That is, one time series signal is extracted per coarse bin. The time series signals are extracted by repeatedly sampling the bins. To generate values for the time series signals, the amplitude values of the frequency bins are sampled at an interval. The resulting 20 time series signals (or time series database of 20 component signals) are monitored for distress call content. The 20 time series signals are provided as inputs to a predictive machine learning model (such as detection ML model 145) or algorithm for monitoring that will detect occurrence of human voice. Processing at process block 430 completes and processing continues at process block 435.

In one embodiment, predictive ML models such as a detection ML model or an extraction ML model may be implemented as one or more non-linear non-parametric (NLNP) regression algorithms used for multivariate anomaly detection, including neural networks (NNs), Support Vector Machines (SVMs), auto-associative kernel regression (AAKR), and similarity-based modeling (SBM), such as the multivariate state estimation technique (MSET) (including Oracle's proprietary Multivariate State Estimation Technique (MSET2)). Thus, in one embodiment, a predictive ML model is a NLNP model or an MSET model.

In one embodiment, a predictive ML model is pre-trained to identify human voice as an anomaly in static noise. The predictive model is trained on a library of audio noise that does not contain human voice (such as second audio content 195 described above). The predictive ML model may be trained based on a time series database. Component signals of the time series database contain audio signal amplitude values of RF static noise (without voice content) for a given frequency bin. Where the predictive ML model is a detection ML model used for monitoring the top 20 frequency bins to detect human voice, the time series database for training (such as second audio content 195 described above) contains 20 component time series signals of audio noise from the top 20 frequency bins. Where the predictive ML model is an extraction ML model used for separating the human voice from noise in the audio content, the time series database for training (such as second audio content 195) contains a number of component time series signals of audio noise from the frequency bins included in the recorded audio content. To train the predictive ML model, the audio signal amplitude values from the component time series signals for a series of observations are provided to the predictive ML model. Thus, during training, a series of sets of values, each set including one value from each component time series signal in the database for a given observation, may be provided in turn to train the predictive ML model.

During training, a configuration of the predictive ML model is automatically adjusted so as to accurately predict or estimate a value for each input value based on other input values. For example, the configuration of the ML model is adjusted to generate, for each input value from a component signal, an estimated or predicted value from the input values for the other component signals in the time series database. Thus, for example, the estimated value for the first of the 20 signals is based on the remaining 19 signals. The adjustment of the configuration, or training, of the predictive ML model is continued until the estimates or predicted values for each signal are consistently within a predetermined acceptable margin of error of the input value for each signal. In this way, the predictive ML model is trained to predict audio noise values for a given audio frequency bin based on audio frequency noise in other bins. Were human voice to occur in the given audio frequency bin during monitoring by a predictive ML model trained in this way, the trained ML model will produce estimates for the given audio bin outside of an acceptable range, and will trigger alerts. The predictive ML model used for detecting the presence of human voice from the time series signals of the bins selected for monitoring may be referred to herein as a detection ML model, such as detection ML model 145.

At process block 435, the processor executing the detection ML model (or algorithm) causes the detection ML model to alert when human voice is detected in the noise. In response to the detection, the processor actuates a fine-grain 100-bin circular buffer. The fine-grain 100-bin circular buffer records time series signals from fine bins included in the 100 coarse bins for a period of time. For example, where the fine bins are 1 Hz wide, a coarse bin may contain 200 fine frequencies, each of which may be sampled and recorded in a time series signal. In one embodiment, all 200 fine frequencies per coarse bin are recorded for the period of time. In one embodiment, a top few fine frequencies in terms of PSD (e.g., the top 20 fine frequencies) for each coarse bin are recorded for the period of time. For example, the top 20 fine frequencies in each of the 100 coarse bins are sampled and recorded as time series signals in the fine-grain 100-bin circular buffer. The sampling may be performed at a sampling rate sufficient to capture the audio content of the various fine frequencies. In one embodiment, the period of time begins at detection of the voice and ends shortly after the human voice is no longer detected. Thus, the fine frequencies are recorded from initial detection until a short time after the human voice ends. Capturing the time series signals of the fine grain frequencies records the distress call in higher resolution for subsequent extraction from background noise, for example as described at process block 445. Processing at process block 435 completes and processing continues at process block 440.

To monitor time-series signals, the processor executes a trained predictive ML model (such as a detection or extraction ML model) to estimate values for the time series signals. The processor calculates the residuals (the absolute value of the difference) between observed values for the time-series signals and model-estimated values for the time-series signals. The processor executes an anomaly detection model to detect anomalous behavior in the time-series signals. In one embodiment, the anomaly detection model uses the sequential probability ratio test (SPRT) to detect anomalous deviations from normal operation (which may include voice or other signal in the audio static noise) by calculating a cumulative sum of the log-likelihood ratio for each successive residual between the measured signals and estimated values, and comparing the cumulative sum against a threshold at which to determine that an anomaly is detected. Where the threshold is crossed, an alert is issued. For example, where the threshold is crossed for the detection ML model, an alert is issued indicating that human voice is detected in one or more of the time-series signals is issued.

At process block 440, the processor executing the detection ML model (or algorithm) causes the detection ML model to alert when the human voice—the potential distress call—is over. This is nominally 10 seconds after the last voice content is detected. This may be measured from the time that the detection ML model ceases issuing alerts. The processor then closes the circular buffer. Recording of the time series signals for the fine frequencies in the 100 bins ceases. Following a detection of the end of the human voice, the processor returns to a readiness mode (in which the predictive ML model is monitoring the 20 time-series signals for human voice, prior to block 435) for the next detection. In one embodiment, the cycle between alert and readiness mode operates continuously during RF scanning.

In one embodiment, the predictive ML algorithm thus identifies and records portions of audio content that include human voice. Also, the ML algorithm thus identifies and excludes from recording other portions of the audio content that do not include human voice. Processing at process block 440 completes and processing continues at process block 445.

Process blocks 415 through 440 make up a voice detection process 450 that autonomously detects human voice in audio noise. (As discussed herein, the audio noise is the audio translation of RF noise in the radio signal). For more than 99% of the time the system is monitoring radio noise (for example as shown in FIG. 1). The frequency axis of the frequency spectrum is divided into 100 bins. The "top" (for example, the top 20) bins are systematically selected for routine surveillance. Routine surveillance includes monitoring time series signals sampled from the selected bins to detect the presence of human voice, and generating alerts upon detection and upon cessation of detection in order to control recording in the circular buffer, as discussed above. In one embodiment, these top bins are selected based on a large library of recorded calls (which include human voice), and an enormous library of radio noise when there are no calls (which does not include human voice, for example as in second audio content 195). The system monitors the top bins most likely to reveal human voice components. Monitoring a few (such as 20 out of 100) optimal bins during routine surveillance is much more computationally efficient than continuously monitoring all bins. When any voice component is detected, the processor can then immediately go to the "always full" circular buffer (or circular file) that has fine frequencies from all 100 bins in it as a function of time to retrieve more detailed data for examination. These 100 bins trace out time series signals for fine frequencies included in the bins over a set period of time for duration of the circular file.

At process block 445, the processor de-noises and enhances the highest-scored individual frequencies that are most likely to carry human voice in an authentic distress call (which have been identified by MSET). In one embodiment, MSET is used to identify optimal frequencies to reveal the human voice detected in previous steps.

As discussed above, in one embodiment the system monitors these time series signals for the fine frequencies with an extraction ML model that has been trained on enormous volumes of "noise only" signals from all the recent time when there were no human voices. Since the extraction ML model has been so well trained on "noise only", the extraction ML model performs anomaly detection where the "anomalies" are any 1, 2, . . . , N bins that contain human voice components, or content of an audio signal for a frequency bin that is produced by human voice. The extraction ML model continuously subtracts off its estimate or predicted value of each signal-which is the estimate of what the noise is expected to be—from the real-time value of the signal-which now anomalously contains human voice components. These differences are referred to as the residuals. When monitoring, the residuals contain an optimal estimate of the anomaly signature. Here, the anomaly is signal components reflecting human voice, for any/all individual fine frequencies in which human voice components have been detected.

Thus, for the purposes of extracting the human voice from the 100 time series signals for the 100 bins recorded in the circular buffer, an additional predictive ML model is used to perform the extraction process. The additional predictive ML model used for extracting human voice from the time series signals recorded in the circular buffer may be referred to herein as an extraction ML model, such as extraction ML model 155. The extraction ML model is trained (as discussed above) to identify human voice in any of the 100 time series signals to be anomalous. The training of the extraction ML model is based on 100 noise-only signals. The trained extraction ML model is then used to estimate or predict the values of each of the 100 time series signals based on the values of the other 99 time series signals. The residuals between actual values received for each signal value and the estimates produced (from the actual values of the other signals) for each signal value form an anomaly signature. The anomaly signature is voice content where the predicted values are audio noise. Thus, the anomaly signature, made up of residuals between expected noise and human voice, is a denoised, enhanced voice signature. This may be stored as a time series database with 100 component residual signals made of the residual values between the input values and predicted values for the corresponding 100 time series signals from the circular buffer. By creating a separate time series database (or other data structure) from the residuals, the voice is extracted from the other audio content.

Thus, where the processor treats voice as an anomaly signature, the residuals provide an enhanced denoised optimal "signature" (collection of fine-grain frequencies) for the voice. This extracted, denoised, enhanced voice signature can then be passed downstream into the speech recognition algorithm. This the speech recognition algorithm performs better using this voice signature because the radio-frequency noise in the audio content has been separated from the human voice by the predictive ML (e.g., MSET) analysis. Processing at process block 445 completes and processing continues at process block 455.

At process block 455, the processor applies an AI speech recognition algorithm (such as OCI AI_Speech Recognition Algorithm) to recognize the content of the detected voice. The AI speech recognition algorithm may identify voice content in English, or in any number of additional languages. The AI speech recognition algorithm is trained to classify sounds (or audio sequences) made by the human voice as being associated with particular text tokens. A token may represent, for example, a word or other character string, a number, or a punctuation mark. In one embodiment, the AI speech recognition algorithm is trained with audio content including human voice in which sounds made by the human voice are labeled with tokens. The token labels used for training have been confirmed to correctly represent the sounds in the human voice. The trained AI speech recognition model will generate text tokens that represent sounds made by the human voice.

The AI speech recognition algorithms transform the audio-based extracted voice to text content. In one embodiment, the AI speech recognition algorithms monitor each of the 100 residual time series signals as an individual audio channel. In one embodiment, the AI speech algorithm generates a data stream such as a JavaScript Object Notation (JSON) stream of the recognized content. The AI speech recognition algorithm recognizes individual tokens in the extracted voice and produces a JSON stream of token data structures. For example, the token data structures may include a text of the token, a start time when the token began in the extracted voice, an end time when the token completed in the extracted voice, a confidence score indicating how certain the algorithm is that the token is correctly identified, and an identification of the type of token (e.g., word, punctuation, number).

The AI speech recognition algorithms also transform the audio-based extracted voice to vocal characteristics associated with the text. Vocal characteristics may include volume, pitch, pace, and timbre. Volume describes degree of loudness of the voice. Pitch describes relative highness or lowness of the voice. Pace describes rapidity with which the voice is speaking. Timbre describes qualities of sound produced by a particular individual. In one embodiment, the AI speech recognition algorithms generate numerical metrics for various vocal characteristics in the extracted voice. In one embodiment, the AI speech recognition algorithm further includes numerical metrics for vocal characteristics of individual tokens in the token data structure for the token. For example, the token data structures may further include minimum, maximum, average, change, beginning, and ending values for volume, pitch and/or timbre. These numerical values are vocal metrics or parameters that describe the vocal characteristics of a token.

The ways that the vocal characteristics change over the course of the distress call may provide information that indicates whether a distress call is a hoax or authentic. The changes in the metrics for the vocal characteristics may be measured over multiple tokens, such as a sequence of tokens. For example, the changes in a vocal characteristic may be measured from the first token of the distress call up to a current token, thus describing the changes in the vocal characteristics up to a present moment in the distress call. Or, the changes in the vocal characteristics may be measured over the course of a sentence. Or, the changes in the vocal characteristics may be measured over a moving window of a fixed number of tokens. Pace may be determined based on the time stamps (beginning and/or ending) for individual tokens over the course of a sequence of tokens for example by determining the number of tokens that occurred in the sequence during the amount of time taken by the sequence.

Speech is thus recognized in the human voice to transform the human voice into tokens that include text and voice characteristics. Processing at process block 455 completes and processing continues at process block 460.

At process block 460, the processor converts the data stream to a digitized CSV file of the recognized content. As each token data structure is received through the JSON stream, the token is parsed to identify the token text, start and end times, confidence score, type of token, and values of vocal characteristics of the token, which are extracted from the token data structure, and the written, in sequential order, into the CSV file. Once the data stream terminates, the CSV file is complete. In one embodiment, CSV files are generated for segments of the data stream, for example, in a moving window of a consistent number of tokens. Processing at process block 460 completes and processing continues at process block 465.

At process block 465, the processor applies an NLP algorithm to the digitized CSV. For example, the NLP algorithm may perform lexical analysis of the comma-separated tokens in the CSV. The lexical analysis assigns a numerical value for a token along one or more stylistic dimensions. Example stylistic dimensions include colloquial vs. literary, concrete vs. abstract, subjective vs. objective, and formal vs. informal. The lexical analysis generates values indicating a position of a word represented by a token along these stylistic dimensions. The position value indicates the extent to which the word exhibits the stylistic element measured along the dimension. These stylistic dimension values generated by lexical analysis may be provided as input variables to the syntactic and semantic analyses (or to ML models for feature scoring), as discussed below.

In another example, the NLP algorithm may perform syntactic analysis or parsing of a sequence of the comma-separated tokens in the CSV. The sequence of comma-separated tokens may be, for example, the sequence tokens that represent a phrase, a sentence, a paragraph, or the end-to-end text of the recognized speech. The syntactic analysis may generate statistics regarding the sequence of words. For example, the syntactic analysis may determine a count of words in the sequence and count(s) of punctuation in the sequence. The syntactic analysis may assign values representing the extent to that the sequence is considered to be complex, compound, loose, or periodic. The syntactic analysis may also generate statistics regarding grammar and proper arrangement. These various statistics generated by syntactic analysis may be provided as input variables to ML models for feature scoring, as discussed below.

In another example, the NLP algorithm may perform semantic analysis of the sequence of comma-separated tokens in the CSV (e.g., a sequence representing a phrase, sentence, or paragraph). The semantic analysis operates to derive the meaning of the sequence. The meaning assigned to the sequence of tokens may be based in part on the stylistic dimensions of the words represented by the individual tokens that were generated by the lexical analysis, in addition to the meanings of the words represented by the individual tokens. The semantic analysis may assign meaning to the sequence of tokens.

For example, the semantic analysis may identify one or more emotions (or sentiments or other affective states) of the distress caller from the arrangement and definitions of words represented by the sequence of tokens. The emotions may include, for example, anger, sadness, fear, or surprise. The semantic analysis may generate one or more values that indicate an extent to which the sequence of tokens exhibits a given emotion. These emotion values generated by semantic analysis may be provided as input variables to ML models for feature scoring, as discussed below.

And, for example, the semantic analysis may identify one or more topics of the distress call from the arrangement and definitions of words represented by the sequence of tokens. The topics may include, for example, damage, injury, sinking, adrift, crash, or other topics discussing an emergency. The semantic analysis may generate one or more values that indicate an extent to which the sequence of tokens exhibits a given topic. These topic values generated by semantic analysis may be provided as input variables to ML models for feature scoring, as discussed below. Processing at process block 465 completes and processing continues at process block 470.

At process block 470, the processor generates and outputs feature scores. Feature scores are generated, for example, for tone, inflection, phrasing, and sentiment features of the recognized speech. A feature score indicates the extent to which a given feature exhibited by the recognized speech is like that historically exhibited by authentic distress calls (or like that exhibited by hoax distress calls). In other words, the feature score shows whether the tone, inflection, phrasing, sentiment, or other feature of the speech is more like authentic distress calls or more like hoax distress calls. The ML regression model for a feature about the recognized speech generates a score for the feature. The score indicates an extent to which the feature is consistent with a genuine distress call or a hoax distress call. For example, the scores may range from 1.00 to 2.00, where 2.00 indicates a hoax distress call and 1.00 indicates a genuine distress call.

The feature scores are generated by a ML regression process. ML regression models are provided for distinguishing between authentic and hoax distress calls based on each different type of feature. For example, models may be provided for distinguishing between hoax and authentic distress calls based on tone, inflection, phrasing, or sentiment of the recognized speech. Further detail on ML regression models for tone, inflection, phrasing, and sentiment is provided below. Also, models may be provided for distinguishing between hoax and authentic distress calls based on various individual emotions (such as anger, sadness, fear, and surprise) when detected by semantic analysis. Also, a model may be provided for distinguishing between hoax and authentic distress calls based on "flatness", a lack of pitch and volume modulations most often attributed to reading from a script or reciting a pre-memorized script. A model may be provided for distinguishing between hoax and authentic distress calls based on pace of the words spoken by the caller, or based on the timbre of the voice of the caller. The additional models may be constructed, trained, and used to monitor incoming distress calls in a manner similar to that described below for the sentiment, tone, phrasing, and inflection models.

The ML regression model may be pre-trained to disambiguate between genuine and hoax distress calls based on information relevant to a feature. The ML regression model is trained on a training library or database of prior or historical distress calls. The prior distress calls in the training library are labeled as to whether they are genuine or hoaxes. The labels are based on after-the-fact, "ground truth" knowledge as to whether the distress call was in actually authentic or a hoax. The feature scores for tone, inflection, phrasing, sentiment, or other features of the historical distress calls in the training library are set based on the label. For example, in the training library, distress calls that were hoaxes are given feature scores of 2.00, and distress calls that were genuine are labeled with a score of 1.00. The distinction between authentic-like and hoax-like feature scores by the regression models is therefore made totally empirically.

During training, in addition to the feature score, an ML regression model for distinguishing between authentic and hoax calls based on a particular feature is provided with additional information that is relevant to the feature. For example, the text or portions of the text, lexical analysis results, syntactic analysis results, and/or semantic analysis results that are relevant to the particular feature that the ML regression model evaluates are provided as input variables to the ML regression model along with the score label. Specific input variables for the sentiment, tone, phrasing, and inflection models are discussed in further detail below. The ML regression model for a feature is automatically configured to predict a feature score based on the input historical information and score labels. Over the course of training, the ML regression model is iteratively configured to produce increasingly accurate predictions (or estimates) of feature scores until a threshold indicating satisfactory performance is reached.

Once the ML regression model for a feature is trained, the ML regression model may be used to predict feature scores for texts that have not already been labeled with a feature score. The ML regression model for the feature is provided with the information about the text that is relevant to the feature. The ML regression model for the feature then generates or predicts a feature score for the feature based on the information provided as inputs. The inputs may include the text of the recognized speech (or portions of the text), lexical analysis results, syntactic analysis results, and/or semantic analysis results. These may be retrieved from, for example, the CSV file. The predicted feature score distinguishes between genuine and hoax distress calls based on its closeness to the score indicating a hoax call (e.g., a score of 2.00) or the score indicating an authentic or genuine call (e.g., a score of 1.00). For example, a feature score closer to 2.00 indicates that the feature is consistent with a hoax distress call, while a feature score closer to 1.00 indicates that the feature is consistent with a genuine distress call. Using feature scores between 1.00 for genuine distress calls and 2.00 for hoax distress calls is convenient for a weighting function discussed below with reference to process block 475, enabling scores generated by the ML regression model to be used directly as weights in the weighting function.

Other ranges for scores may also be used, for example, −1 (indicating hoax distress calls) through +1 (indicating genuine distress calls).

Sentiment is a feature that reflects a general emotional feeling or sense conveyed by a text. The NLP semantic analysis performed above at process block 465 operates to identify, extract, and quantify emotions (or other affective states) of the caller (that is, the speaker of the human voice in the distress call). For example, for one or more individual emotions, the NLP semantic analysis produces a numeric value representing the extent to which the individual emotion is conveyed by the recognized speech. In one embodiment, the values along the stylistic dimensions of the words as generated by the lexical analysis may also be provided as input variables to the NLP semantic analysis along with the text of the recognized speech, and from them, the NLP semantic analysis generates the values representing the extent to which the individual emotions appear in the recognized speech. One or more of the individual emotions may be input variables to the ML regression model for the sentiment feature. For example, the values for anger, sadness, fear, and/or surprise may be provided as inputs to the ML regression model for sentiment. In one embodiment, the ML regression model for sentiment further accepts as input variables the topic values produced by the NLP semantic analysis discussed above.

During a training phase, the ML regression model for sentiment is trained to generate a sentiment feature score for distress calls. The model is trained using the values for the individual emotions produced by semantic analysis of the historical distress calls and sentiment feature scores indicating whether the historical distress call is authentic or a hoax. In an analysis phase after training, the trained ML regression model for sentiment evaluates incoming, unlabeled distress calls to generate a sentiment feature score for the incoming distress call. The sentiment feature score for the incoming distress call is generated based on the values for the individual emotions produced by semantic analysis of the incoming distress call. (In one embodiment, the model is also trained with and generates the sentiment score based on the values for the individual topics.) The sentiment feature score generated by the ML regression model for sentiment indicates whether sentiment of the incoming distress call is more like the sentiment of authentic calls (e.g., indicated by a feature score closer to 1.0) or more like the sentiment of hoax distress calls (e.g., indicated by a feature score closer to 2.0).

Tone is a feature that reflects use of specific pitch of voice in a word to impart a less emphatic or more emphatic meaning, or to impart mood or temper of the caller. The AI speech recognition analysis to generate vocal characteristics performed above at process block 455 operates to detect and quantify various aspects of pitch for the words spoken by the caller. For example, the AI speech recognition analysis generates values for vocal characteristics of a word, including minimum, maximum, average, change, beginning, and ending values for the pitch with which a word or sequence of words is spoken. One or more of these vocal characteristics of pitch may be input variables to the ML regression model for the tone feature. For example, one or more of the minimum pitch in a sequence of words, the maximum pitch in a sequence of words, the average pitch over a sequence of words, the amount of change in the pitch over a sequence of words, the pitch at the beginning of the sequence of words, and the pitch at the ending of the sequence of words are provided as inputs to the ML regression model for tone.

During a training phase, the ML regression model for tone is trained to generate a tone feature score for distress calls. The model is trained using the values for the vocal characteristics of pitch produced by AI speech recognition analysis of the historical distress calls and tone feature scores indicating whether the historical distress call is authentic or a hoax. In an analysis phase after training, the trained ML regression model for tone evaluates incoming, unlabeled distress calls to generate a tone feature score for the incoming, unlabeled distress call. The tone feature score for the incoming distress call is generated based on the values for the vocal characteristics of pitch produced by AI speech recognition analysis of the incoming distress call. The tone feature score generated by the ML regression model for tone indicates whether the tone of the incoming distress call is more like the tone of authentic distress calls (e.g., indicated by a feature score closer to 1.0) or more like the tone of hoax distress calls (e.g., indicated by a feature score closer to 2.0).

Phrasing is a feature that reflects the style of discourse and engagement in a text. The NLP syntactic analysis performed above at process block 465 operates to generate statistics regarding the sequence of words in the recognized speech. For example, the NLP syntactic analysis produces values representing the statistics of how complex the sequence is, how compound the sequence is, how loose the sequence is, how periodic the sequence is, how grammatically correct the sequence is. Complexity may be measured in number of subordinate clauses in a sentence. Compound-ness may be measured by the number of subjects (or predicates) in a sentence. Looseness may be determined the most important clause occurring at the beginning of a sentence. Periodicity may be determined by the most important clause occurring at the end of a sentence.

Also, for example, the NLP syntactic analysis produces values representing the collective statistics of the stylistic dimension values (generated by lexical analysis for individual words) over the sequence of words. Additionally, for example, the NLP syntactic analysis counts the number of words in the sequence, the number of punctuation marks in the sequence. One or more of these statistic values may be input variables to the ML regression model for the phrasing feature. For example, the statistics regarding the sequence of words may include values for complexity, compound-ness, looseness, periodicity, ratio of literary vs. colloquial words, ratio of abstract vs. concrete words, ratio of subjective vs. objective words, ratio of formal vs. informal words, word count, and punctuation count. One or more of these statistics of the sequence are provided as inputs to the ML regression model for phrasing.

During a training phase, the ML regression model for phrasing is trained to generate a phrasing feature score for distress calls. The model is trained using the statistics regarding the sequence of words produced by syntactic analysis of the historical distress calls as well as phrasing feature scores indicating whether the historical distress call is authentic or a hoax. In an analysis phase after training, the trained ML regression model for phrasing evaluates incoming, unlabeled distress calls to generate a phrasing feature score for the incoming, unlabeled distress call. The phrasing feature score for the incoming distress call is generated based on the statistics regarding the sequence of words produced by syntactic analysis of the incoming distress call. The phrasing feature score generated by the ML regression model for tone indicates whether the phrasing of the incoming distress call is more like the phrasing of authentic distress calls (e.g., indicated by a feature score closer to 1.0) or more like the phrasing of hoax distress calls (e.g., indicated by a feature score closer to 2.0).

Note that the phrasing analysis does not predict from any type of linguistic theory that people who call in hoax calls predominantly use one type of phrasing compared with people who call in real maritime emergencies. In fact, if the phrasing feature scores are random between the historical authentic and hoax distress calls recorded in the training library, then the phrasing feature score will have no effect on the determination of hoax or authenticity. Further, if the phrasing feature scores are random between historical authentic and hoax, they will not lower the confidence on the overall hoax-vs-authentic decision. If, however, the phrasing feature score and the other feature scores are skewed between the known authentic distress calls and the known hoax distress calls in the training database, use of the phrasing feature score and the other scores strongly fortifies the confidence in the final hoax-vs-authentic classification.

Inflection is a feature that reflects voice modulation by the caller. Examples of voice modulation include raising the pitch of one's voice slightly to indicate a question, lowering the pitch of one's voice to end a declarative sentence, speaking louder to indicate excitement or fear, or speaking softer to express sadness. Inflection may also reflect the pace at which the caller is speaking, for example speaking rapidly to indicate excitement or fear, or speaking slowly to indicate calm. The absence of inflection is speaking in a monotone, with a lack of pitch and volume modulations also described herein as "flatness". Monotonic speech is often a characteristic of a person reading a prepared statement or reciting a memorized statement.

The AI speech recognition analysis to generate vocal characteristics performed above at process block 455 operates to detect and quantify various aspects of pitch and volume for the words spoken by the caller. For example, the AI speech recognition analysis generates values for vocal characteristics of a word, including minimum, maximum, average, change, beginning, and ending values for both the pitch and volume with which a word or sequence of words is spoken. One or more of these vocal characteristics of pitch may be input variables to the ML regression model for the tone feature. For example, one or more of the minimum pitch in a sequence of words, the maximum pitch in a sequence of words, the average pitch over a sequence of words, the amount of change in the pitch over a sequence of words, the pitch at the beginning of the sequence of words, the pitch at the ending of the sequence of words, the minimum volume in a sequence of words, the maximum volume in a sequence of words, the average volume over a sequence of words, the amount of change in the volume over a sequence of words, the volume at the beginning of the sequence of words, and the volume at the ending of the sequence of words are provided as inputs to the ML regression model for inflection.

Additionally, the AI speech recognition analysis performed above at block 455 also operates to place timestamps on words spoken by the caller. A pace of the caller's speech may be derived from the words and the timestamps.

During a training phase, the ML regression model for inflection is trained to generate an inflection feature score for distress calls. The model is trained using the values for the vocal characteristics of pitch and volume produced by AI speech recognition analysis of the historical distress calls and inflection feature scores indicating whether the historical distress call is authentic or a hoax. In an analysis phase after training, the trained ML regression model for inflection evaluates incoming, unlabeled distress calls to generate an inflection feature score for the incoming, unlabeled distress call. In one embodiment, values for pace may also be included as a basis for the inflection score in the training and analysis phases. The inflection feature score for the incoming distress call is generated based on the values for the vocal characteristics of pitch and volume (and in one embodiment, pace) produced by AI speech recognition analysis of the incoming distress call. The inflection feature score generated by the ML regression model for inflection indicates whether the inflection of the incoming distress call is more like the inflection of authentic distress calls (e.g., indicated by a feature score closer to 1.0) or more like the inflection of hoax distress calls (e.g., indicated by a feature score closer to 2.0).

Features scores may be generated for each feature of a text. These may be output individually, or as a data structure with a feature score for each of the features. The feature scores for each of the features may also be referred to herein as sub-scores, indicating that they may be used in conjunction with each other as components of an overall score for a group of features. Thus, for the text converted from the voice at process blocks 455-460, ML regression models for each feature generate feature scores for the text. Processing at process block 470 completes and processing continues at process block 475.

Process blocks 455 through 470 make up a speech recognition and processing process 480 that recognizes the speech content of detected voice signals, and scores the voice signal for tone, inflection, phrasing, and sentiment.

At process block 475, the processor applies a 3D classification/discrimination analytic. The 3D classification/discrimination analytic may include analysis to determine significance of one or both of (i) the determination that voice is present in the audio content, and (ii) the determination that the detected voice is a hoax or an authentic (genuine) distress call. The 3D classification/discrimination analytic includes generating a residual 3D surface (or time series database, as discussed below) of residual values between a voice 3D surface of audio content that includes the human voice, and a noise 3D surface of audio content that includes static noise alone, with no human voice. Where the significance of the determination of the voice as being a hoax or a genuine, rather than the determination that human voice was present, the 3D classification/discrimination analytic also includes conditionally weighting residual values based on the determination. For example, one weight is applied to the values of residuals in the residual 3D surface where the scores generated at process block 470 indicate a hoax distress call, and another weight is applied to the values of residuals in the residual 3D surface where the scores generated at process block 470 indicate a genuine distress call. The 3D classification/discrimination analytic also includes generating a cumulative mean absolute error from the residual surface.

For context, a time series database that records amplitude values of time series signals for multiple frequencies may be represented as a 3D surface of amplitude values plotted against time and frequency. Thus, a 3D surface is a representation of a time series database, and the operations discussed herein as an operation on a 3D surface may be performed in the time series data structures that are represented by the 3D surface, without rendering a visualization of a 3D surface. Each of the residual, voice, and noise 3D surfaces discussed above have similar dimensions in the frequency and time axes. The frequency axis has the number of time series signals that are in each of the time series databases, and the time axis includes the number of observations that are in each of the time series database.

Referring again briefly to FIG. 3 for context, 3D plot 300 shows audio spectrum amplitudes 305 of audio background noise as a function of frequency and time, with fine frequencies. 3D plot 300 represents one example of the audio content of RF static noise. This audio noise is a background surface during the time there is no voice present. In one embodiment, the predictive ML models are trained based on background surfaces of static audio noise such as that shown in 3D plot 300. Where a voice is detected it shows up on numerous fine frequency bins. After the background surface (that is, the surface of FIG. 3 reflecting background noise as a function of frequency and time) is subtracted off from the real-time surface (which is stored in the circular file being filled in real-time and containing some detected voice components) a surface of noise (with raised ridges where the voice components show up) is generated. The "real-time surface" refers to the time series database of audio content that is being recorded in the circular buffer or file.

Note that a subtraction of the two surfaces may yield both positive and negative values. So, in one embodiment, the absolute value of the residual surface is determined instead, and the entire 3D residual surface (of residual amplitudes versus frequency and time) has only positive values.

Where there is no voice present in the real-time surface, subtracting the background and real-time surface yields a residual surface of residuals that are close to zero. But where there is voice present in the real-time surface, subtracting the background and real-time surface produces a residual surface in which there are many components that are significantly higher than zero because of the voice signatures. Further, subtracting the background surface from the real-time surface that has voice in it effectively removes (or minimizes) the radio frequency noise in the audio content of the real-time surface.

As discussed above, the 3D classification/discrimination analytic may include analysis to determine significance of the determination or decision that voice is present in the audio content. In one embodiment, the system determines how significant is the decision that a voice is present by summing across frequency bins and time elements of the time series signals (for example all 100 frequency bins and all time elements) to generate a Cumulative Mean Absolute Error (CMAE). The CMAE is a quantitative score by which to discriminate that there is really a voice present, and with a quantitative confidence factor, from the null hypothesis that there is no voice present. Further, the CMAE confidence factor is generated autonomously and, in one embodiment, removes human subjectivity from whether a voice was "heard" or not. This CMAE-based process may thus be useful for discrimination between "voice" and "no-voice" with a quantitative confidence factor.

As discussed above, the 3D classification/discrimination analytic may also include analysis to determine significance of the determination that the detected voice is a hoax or an authentic (genuine) distress call. The CMAE can be further applied to fine-tune the new process to discriminate between authentic and hoax distress calls. In one embodiment, to discriminate between authentic and hoax, the processor refers to four sub-scores extracted by the NLP algorithm: the sub-scores for tone, inflection, phrasing, and sentiment. The processor uses these four sub-scores to weight the individual elements (the residual values) in the previous CMAE quantification process. (In one embodiment, additional sub-scores for other features such as specific emotions and/or flatness may also be included in the weighting of the residual values.) Thus, for each sub-score, a sub-score weighting function is defined as 1.00 where that sub-score is consistent with a large library of past authentic emergency distress calls. The sub-score weights are elevated per a learned classification process (discussed above with reference to process block 470) with a similar large library of distress calls that were proven to be hoaxes. In one embodiment, the sub-scores are scaled between 1.00 for authentic vs 2.00 for hoax. The weights may be applied as multipliers of the residual values. As discussed above, in one embodiment the sub-scores themselves may be used as weights, provided that the ML classifier models are trained to generate feature scores between 1.00 and 2.00, consistent with the weighting function.

The processor now goes back through the residuals (that is, every position in the residual surface of frequency vs. time) and recursively multiplies each residual value by the sequence of 4 sub-scores. Note that for total noise values in the residual surface, those are near to zero anyway (so multiplying by the 4 sub-scores still yields very small values). However, the detected, extracted, enhanced voice components now get weighted more heavily by the learned sub-score metrics. Hence for this second pass through, the 3D CMAE Classification/Discrimination Analytic yields an overall CMAE Authentic-vs-Hoax metric. The application of weights has been trained through the two separate databases of authentic and hoax calls to make the final decision between authentic and hoax much more definitely than subjective human listening. Processing at process block 475 completes and processing continues at process block 485.

At process block 485, the processor generates and sends an alert message that a detected distress call is genuine or is a hoax, with a corresponding confidence factor for the determination. This message may be sent for subsequent display to a user of the system. Processing at process block 485 completes and processing continues to end block 490, where process 400 ends.

In one embodiment, real time detection of an emergency distress call by a computer is enabled by the steps of method 200 or method 400. In one embodiment, real time determination as to whether a distress call is authentic or a hoax is enabled by the steps of method 200 or method 400. These, where such real time results were not previously possible to be accomplished by computing devices.

Example Environment

Figure 5:
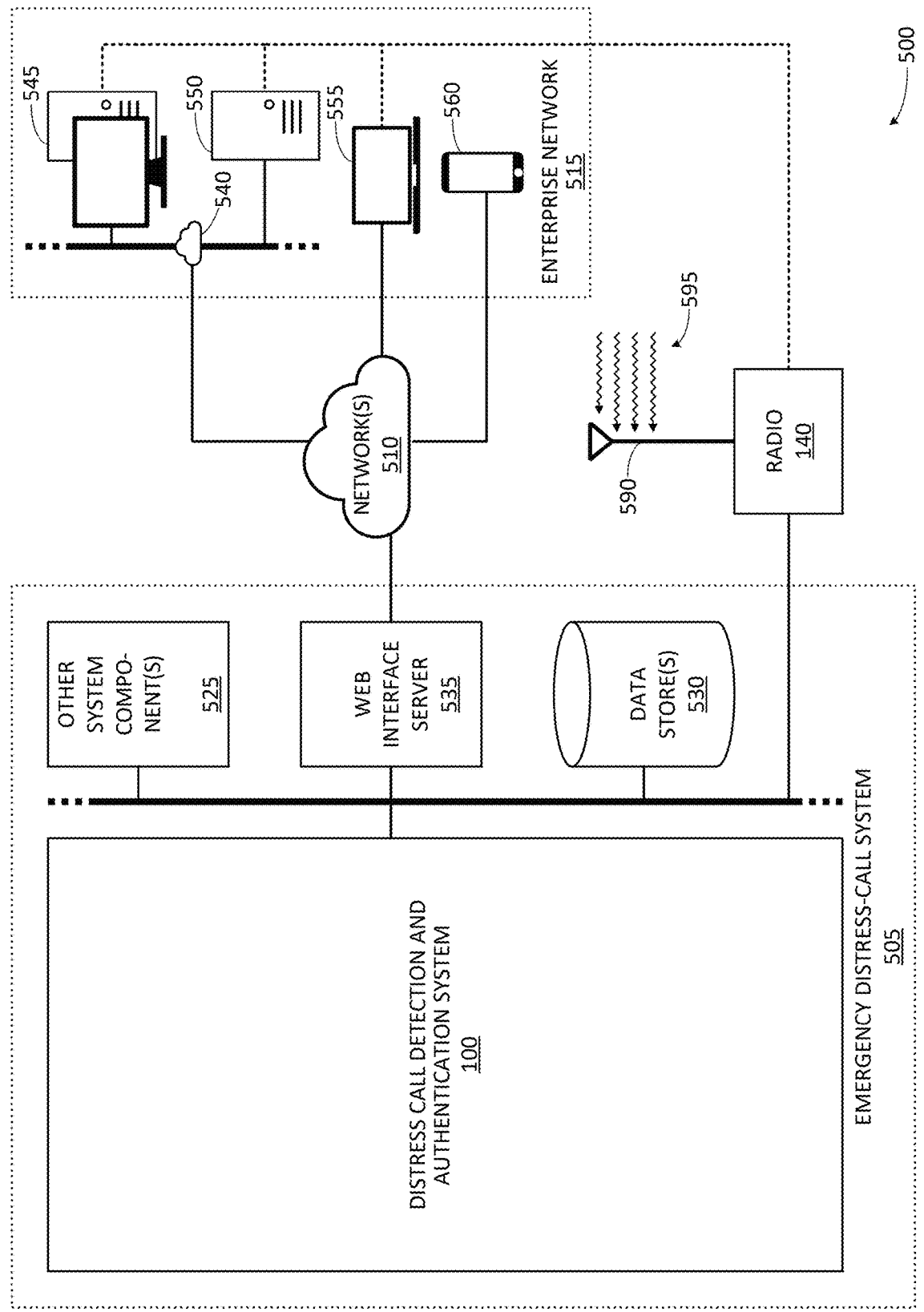
FIG. 5 illustrates one embodiment of a computing environment associated with autonomous emergency distress-call detection, characterization, and authentication.

FIG. 5 illustrates one embodiment of a system 500 associated with autonomous emergency distress-call detection, characterization, and authentication. In one embodiment, the steps of methods 200 and 400 are performed by one or more components of system 500.

In one embodiment, system 500 includes an emergency distress call system 505 connected by the Internet 510 (or another suitable communications network or combination of networks) to an enterprise network 515. In one embodiment, emergency distress call system 505 includes various systems and components which include components of distress call detection and authentication system 100, other system components 525, data store(s) 530, and web interface server 535. In one embodiment, other system components 525 may further include user administration modules for governing the access of users to emergency distress call system 505.

Each of the components of emergency distress call system 505 is configured by logic to execute the functions that the component is described as performing. In one embodiment, the components of emergency distress call system 505 may be implemented as sets of one or more software modules executed by one or more computing devices specially configured for such execution. In one embodiment, the components of emergency distress call system 505 are implemented on one or more hardware computing devices or hosts interconnected by a data network. For example, the components of emergency distress call system 505 may be executed by network-connected computing devices of one or more compute hardware shapes, such as central processing unit (CPU) or general-purpose shapes, dense input/output (I/O) shapes, graphics processing unit (GPU) shapes, and high-performance computing (HPC) shapes. In one embodiment, the components of emergency distress call system 505 are implemented by dedicated computing devices. In one embodiment, the components of emergency distress call system 505 are implemented by a common (or shared) computing device, even though represented as discrete units in FIG. 5. For example, the components of emergency distress call system 505 may be implemented by a portable server (such as an Oracle Roving Edge Device (RED)) or other computing device configured with hardware and software to implement the functions and features described herein. In one embodiment, emergency distress call system 505 may be hosted by a dedicated third party, for example in an infrastructure-as-a-service (IAAS), platform-as-a-service (PAAS), or software-as-a-service (SAAS) architecture.

In one embodiment, the components of system 500 intercommunicate by electronic messages or signals. These electronic messages or signals may be configured as calls to functions or procedures that access the features or data of the component, such as for example application programming interface (API) calls. In one embodiment, these electronic messages or signals are sent between hosts in a format compatible with transmission control protocol/internet protocol (TCP/IP) or other computer networking protocol. Each component of system 500 may (i) generate or compose an electronic message or signal to issue a command or request to another component, (ii) transmit the message or signal to other components of computing system 100, (iii) parse the content of an electronic message or signal received to identify commands or requests that the component can perform, and (iv) in response to identifying the command or request, automatically perform or execute the command or request. The electronic messages or signals may include queries against databases. The queries may be composed and executed in query languages compatible with the database and executed in a runtime environment compatible with the query language.

In one embodiment, remote computing systems (such as those of enterprise network 515) may access information or applications provided by emergency distress call system 505 through web interface server 535. In one embodiment, the remote computing system may send requests to and receive responses from web interface server 535. In one example, access to the information or applications may be effected through use of a web browser on a personal computer 545, remote user computers 555 or mobile device 560. For example, these computing devices 545, 555, 560 of the enterprise network 515 may request a graphical user interface that presents alerts regarding detected distress calls, as well as determinations as to their statuses as authentic or hoax calls to a certain degree of confidence. In one example, communications may be exchanged between web interface server 535 and personal computer 545, server 550, remote user computers 555 or mobile device 560, and may take the form of remote representational state transfer (REST) requests using JavaScript object notation (JSON) as the data interchange format for example, or simple object access protocol (SOAP) requests to and from XML servers. The REST or SOAP requests may include API calls to components of emergency distress call system 505. For example, computers 545, 550, 555 of the enterprise network 515 may request data updates and alerts regarding detected distress calls, as well as determinations as to their statuses as authentic or hoax calls to a certain degree of confidence.

Enterprise network 515 may be associated with a business. For simplicity and clarity of explanation, enterprise network 515 is represented by an on-site local area network 540 to which one or more personal computers 545, or servers 550 are operably connected, along with one or more remote user computers 555 or mobile devices 560 that are connected to enterprise network 515 through network(s) 510. Each personal computer 545, remote user computer 555, or mobile device 560 is generally dedicated to a particular end user, such as an employee or contractor associated with the business, although such dedication is not required. The personal computers 545 and remote user computers 555 can be, for example, a desktop computer, laptop computer, tablet computer, or other device having the ability to connect to local area network 540 or Internet 510. Mobile device 560 can be, for example, a smartphone, tablet computer, mobile phone, or other device having the ability to connect to local area network 540 or network(s) 510 through wireless networks, such as cellular telephone networks or Wi-Fi. Users of the enterprise network 515 interface with emergency distress call system 505 across network(s) 510.

In one embodiment, data store 560 is a computing stack for the structured storage and retrieval of one or more collections of information or data in non-transitory computer-readable media, for example as one or more data structures. In one embodiment, data store 560 includes one or more databases configured to store and serve information used by emergency distress call system 505. In one embodiment, data store 560 includes one or more time-series databases configured to store and serve time-series data. In one embodiment, the time-series database is a not only SQL (NOSQL) database. In one embodiment, the time-series database is an Oracle® database. In some example configurations, data store(s) 560 may be implemented using one or more compute shapes, such as Oracle® Exadata compute shapes, network-attached storage (NAS) devices and/or other dedicated server device.

In one embodiment, the components of system 500 include one or more components configured for implementing methods, functions, and features described herein associated with autonomous, computerized distress call detection and authentication. In one embodiment, steps of methods 200 and 400 are performed by the components of system 500, such as distress call detection and authentication system 100. In one embodiment, distress call detection and authentication system 100 is one or more special purpose computing devices (such as computing device 605) configured with logic 630. In one embodiment, distress call detection and authentication system 100 is a module of a special purpose computing device configured with logic 630.

—Selected Advantages—

Advantageously, the systems, methods, and other embodiments for autonomous emergency distress-call detection, characterization, and authentication described herein enable the use of ML for (i) autonomously detecting human emergency distress calls and (ii) autonomously discriminating "authentic vs hoax" calls for the purposes of actuating emergency-responder operations and with a quantitative confidence factor that is fully validated against a large database of prior recorded distress calls. This improvement to the technology of emergency signal detection and response was not previously possible without the systems, methods, and other embodiments described herein.

In another advantage, as a database of prior recorded distress calls grows with time, the confidence factor is bootstrapped into higher values.

In a further advantage, the systems, methods, and other embodiments for autonomous emergency distress-call detection, characterization, and authentication described herein improve the technology of emergency distress call detection by removing human subjectivity in split-second decisions between authentic emergencies and hoax calls. Absent such subjectivity, responses are made more consistently, and without regard to fatigue on the part of a human watch stander. Yet another advantage of the systems, methods, and other embodiments described herein is that they are made less human-intensive. Distress call monitoring requires large teams of humans working in 5-shift operations for 24×7 attention to emergency broadcast channels. These operations involve human watch standers having to listen through headphones to radio static (noise static is present 99.9% of the time on all monitored channels), to detect humans talking amid all the RF noise.

Note that while the present invention is written up in the context of English language distress calls, other languages are contemplated as well.

Computing Device Embodiment

Figure 6:
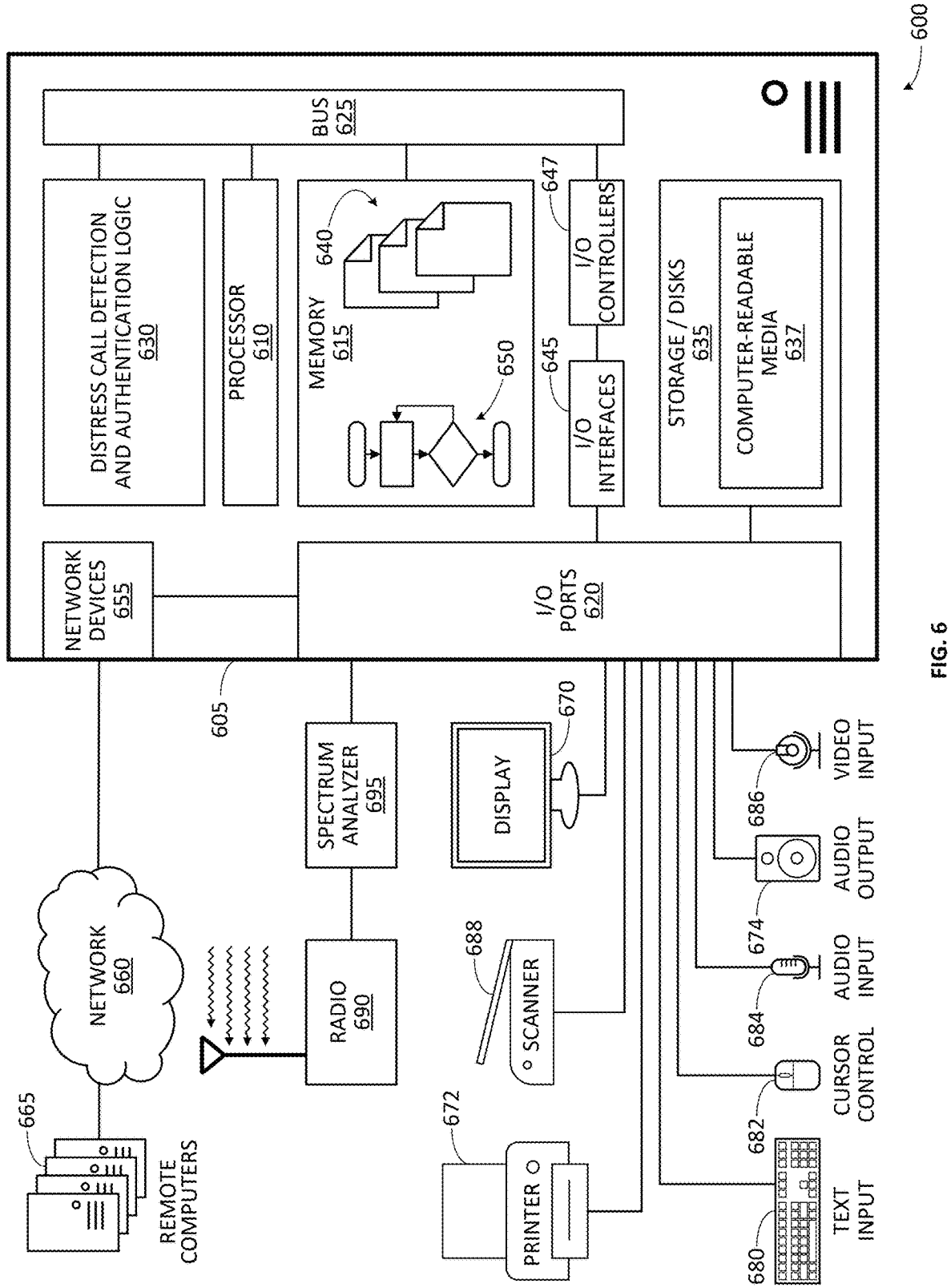
FIG. 6 illustrates an embodiment of a computing system configured with the example systems and/or methods disclosed.

FIG. 6 illustrates an example computing system 600 that is configured and/or programmed as a special purpose computing device with one or more of the example systems and methods described herein, and/or equivalents. The example computing device may be a computer 605 that includes a processor 610, a memory 615, and input/output ports 620 operably connected by a bus 625. In one example, the computer 605 may include distress call detection and authentication logic 630 configured to facilitate autonomous emergency distress-call detection characterization, and authentication logic similar to the logic, systems, and methods shown and described with reference to FIGS. 1-5. In different examples, the logic 630 may be implemented in hardware, a non-transitory computer-readable medium with stored instructions 637, firmware, and/or combinations thereof. While the logic 630 is illustrated as a hardware component attached to the bus 625, it is to be appreciated that in other embodiments, the logic 630 could be implemented in the processor 610, stored in memory 615, or stored in disk 635.

In one embodiment, logic 630 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to autonomously detect, characterize, and authenticate emergency distress-calls. The means may also be implemented as stored computer executable instructions that are presented to computer 605 as data 640 that are temporarily stored in memory 615 and then executed by processor 610.

Logic 630 may also provide means (e.g., hardware, non-transitory computer-readable medium that stores executable instructions, firmware) for performing autonomous emergency distress-call detection characterization, and authentication.

Generally describing an example configuration of the computer 905, the processor 610 may be a variety of various processors including dual microprocessor and other multi-processor architectures. A memory 615 may include volatile memory and/or non-volatile memory. Non-volatile memory may include, for example, ROM, PROM, and so on. Volatile memory may include, for example, RAM, SRAM, DRAM, and so on.

A storage disk 635 may be operably connected to the computer 905 through, for example, an input/output (I/O) interface (e.g., card, device) 645 and an input/output port 620 that are controlled by at least an input/output (I/O) controller 647. The disk 635 may be, for example, a magnetic disk drive, a solid-state disk drive, a floppy disk drive, a tape drive, a Zip drive, a flash memory card, a memory stick, and so on. Furthermore, the disk 635 may be a CD-ROM drive, a CD-R drive, a CD-RW drive, a DVD ROM, and so on. The memory 615 can store a process 650 and/or a data 640, for example. The disk 635 and/or the memory 615 can store an operating system that controls and allocates resources of the computer 605.

The computer 605 may interact with, control, and/or be controlled by input/output (I/O) devices via the input/output (I/O) controller 647, the I/O interfaces 645 and the input/output ports 620. The input/output devices may include one or more displays 670, printers 672 (such as inkjet, laser, or 3D printers), and audio output devices 674 (such as speakers or headphones), text input devices 680 (such as keyboards), a pointing and selection device 682 (such as mice, trackballs, touchpads, touch screens, joysticks, pointing sticks, stylus mice), audio input devices 684 (such as microphones), video input devices 686 (such as video and still cameras), video cards (not shown), disk 635, network devices 655, sensors (not shown), and so on. The input/output ports 620 may include, for example, serial ports, parallel ports, and USB ports. In one embodiment, the computer 605 may be connected to a radio 690 (and antenna) in order to receive broad spectrum radio frequency signals and translate them into audio signals. In one embodiment, the computer 605 may be connected to radio 690 through spectrum analyzer 695. Spectrum analyzer 695 is configured to describe audio signals by signal amplitude against frequency over time.

The computer 605 can operate in a network environment and thus may be connected to the network devices 655 via the I/O interfaces 645, and/or the I/O ports 620. Through the network devices 655, the computer 605 may interact with a network 660. Through the network 660, the computer 605 may be logically connected to remote computers 665, and to RF streams from a data service or from a radio (such as a hardware radio receiver and/or a software defined radio). Networks with which the computer 605 may interact include, but are not limited to, a LAN, a WAN, and other networks.

No action or function described or claimed herein is performed by the human mind. An interpretation that any action or function can be performed in the human mind is inconsistent with and contrary to this disclosure.

In one embodiment, each step of computer-implemented methods described herein may be performed by a processor (such as processor 610 as shown and described with reference to FIG. 6) of one or more computing devices (i) accessing memory (such as memory 615 and/or other computing device components) and (ii) configured with logic to cause the system to execute the step of the method (such as logic 630 shown and described with reference to FIG. 6). For example, the processor accesses and reads from or writes to the memory to perform the steps of the computer-implemented methods described herein. These steps may include (i) retrieving any necessary information, (ii) calculating, determining, generating, classifying, or otherwise creating any data, and (iii) storing for subsequent use any data calculated, determined, generated, classified, or otherwise created. References to storage or storing indicate storage as a data structure in memory or storage/disks of a computing device (such as memory 615, or storage/disks 635 of computing device 605 or remote computers 665 shown and described with reference to FIG. 6, or in data stores 530 shown and described with reference to FIG. 5).

In one embodiment, each subsequent step of a method commences automatically in response to parsing a signal received or stored data retrieved indicating that the previous step has been performed at least to the extent necessary for the subsequent step to commence. Generally, the signal received or the stored data retrieved indicates completion of the previous step.

Software Module Embodiments

In general, software instructions are designed to be executed by one or more suitably programmed processors accessing memory. These software instructions may include, for example, computer-executable code and source code that may be compiled into computer-executable code. These software instructions may also include instructions written in an interpreted programming language, such as a scripting language.

In a complex system, such instructions may be arranged into program modules with each such module performing a specific task, process, function, or operation. The entire set of modules may be controlled or coordinated in their operation by an operating system (OS) or other form of organizational platform.

In one embodiment, one or more of the components described herein are configured as modules stored in a non-transitory computer readable medium. The modules are configured with stored software instructions that when executed by at least a processor accessing memory or storage cause the computing device to perform the corresponding function(s) as described herein.

Cloud or Enterprise Embodiments

In one embodiment, distress call detection and authentication system 100 is a computing/data processing system including an application or collection of distributed applications for enterprise organizations. The applications and computing system may be configured to operate with or be implemented as a cloud-based network computing system, an infrastructure-as-a-service (IAAS), platform-as-a-service (PAAS), or software-as-a-service (SAAS) architecture, or other type of networked computing solution. In one embodiment the present system is a centralized server-side application that provides at least one or more of the functions disclosed herein and a graphical user interface to access and operate them, and that is accessed by many users via computing devices/terminals communicating with the present computing system (functioning as the server) over a computer network.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium that includes stored thereon computer-executable instructions that when executed by at least a processor of a computer system cause the computer system to:
    detect a human voice as an anomaly in audio content of a radio signal that includes the human voice and static noise from the radio signal;
    extract data that represents the human voice from the audio content by:
        (a) generating second audio content that is estimated for the audio content by an extraction ML model, wherein the extraction ML model is trained on second static noise of radio signals that do not include voice to approximate the static noise overlaying the human voice in the audio content; and
        (b) generating a residual surface from (i) the audio content that includes the human voice and the static noise and (ii) the second audio content that is estimated for the audio content by the extraction ML model, wherein the data that represents the human voice is the residual surface;
    determine a cumulative mean absolute error from the residual surface;
    recognize speech in the data that represents the human voice to transform the data that represents the human voice into vocal metrics;
    generate feature scores that represent features of the recognized speech based at least in part on the vocal metrics;
    classify the human voice as either a hoax distress call or an authentic distress call based on the feature scores;
    include in an alert a detection confidence factor that the human voice detected is actually a human voice, wherein the detection confidence factor is based on the cumulative mean absolute error; and
    present the alert that indicates that the human voice is one of the hoax distress call or the authentic distress call.

2. The non-transitory computer-readable medium of claim 1, wherein the instructions to generate feature scores that represent features of the recognized speech based at least in part on the vocal metrics further cause the computer system to:
    generate a feature score for tone or inflection based at least in part on one or more of the vocal metrics of volume, pitch, or pace for the recognized speech, wherein the feature score for tone or inflection indicates an extent to which the tone or inflection of the human voice is consistent with a genuine distress call, and wherein the feature score for tone or inflection is one of the feature scores.

3. The non-transitory computer-readable medium of claim 1, wherein the instructions to generate feature scores that represent features of the recognized speech based at least in part on the vocal metrics further cause the computer system to:
    generate the feature score for phrasing or sentiment based on one or more of words or an arrangement of words in a text of the recognized speech, wherein the feature score for phrasing or sentiment indicates an extent to which the phrasing or sentiment in the text of the recognized speech is consistent with a genuine distress call, and wherein the feature score for phrasing or sentiment is one of the feature scores.

4. The non-transitory computer-readable medium of claim 1, further comprising instructions that when executed by at least the processor cause the computer system to:
    generate a residual surface from the audio content that includes the human voice and second audio content that does not include human voice;
    apply a first weight to residuals of the residual surface in response to the classification of the human voice as the hoax distress call, or apply a second weight to the residuals of the residual surface in response to the classification of the human voice as the authentic distress call;
    determine a cumulative mean absolute error from the weighted residual surface; and
    include in the alert a hoax confidence factor that the human voice is correctly classified as a hoax, wherein the hoax confidence factor is based on the cumulative mean absolute error.

5. The non-transitory computer-readable medium of claim 1, wherein the instructions to detect the human voice as an anomaly in the audio content of the radio signal further cause the computer system to:
    divide a spectrum of the audio content into a set of frequency bins;
    select a subset of the frequency bins that are most likely to include human voice distress calls; and
    detect the human voice in the subset of the frequency bins with a first machine learning model that has been trained to identify human voice in the subset of frequency bins as an anomaly.

6. The non-transitory computer-readable medium of claim 1, wherein the instructions to extract the data that represents the human voice from the audio content further cause the computer system to:
    in response to detecting the human voice, begin recording the audio content;
    in response to detecting that the human voice has ceased in the audio content for a pre-determined amount of time, end recording the audio content; and
    extract the data that represents the human voice from the audio content with a machine learning model that has been trained to identify human voice in the audio content as an anomaly.

7. A computer-implemented method, comprising:
receiving a suspected distress call in audio content of a radio signal that includes first static noise from the radio signal;
generating second audio content that is estimated for the audio content by an extraction ML model, wherein the extraction ML model is trained on second static noise of radio signals that do not include voice to approximate the first static noise in the audio content;
generating residuals between (i) the audio content that includes the suspected distress call and (ii) the second audio content that contains second radio frequency noise and does not contain human voice to extract audio of the suspected distress call;
generating a detection confidence factor that the suspected distress call was correctly detected based on the residuals;
converting the audio of the suspected distress call into text of the call and vocal metrics of the call;
generating feature scores representing features of the suspected distress call based on the text and vocal metrics;
generating a classification, by a machine learning model, of the suspected distress call as either a hoax distress call or an authentic distress call based on the feature scores, wherein the machine learning model is trained based on feature scores from a set of known authentic distress calls and a set of known hoax distress calls; and
generating an alert that indicates the classification of the suspected distress call and the detection confidence factor.

8. The computer-implemented method of claim 7, further comprising:
generating residuals between first data that represents first audio of the suspected distress call and second data that represents second audio that contains radio frequency noise and does not contain a distress call;
weighting the residuals with a first weight where the suspected distress call is classified as a hoax or weighting the residuals with a second weight where the suspected distress call is classified as authentic; and
generating a hoax confidence factor that the classification is correct based on the weighted residuals.

9. The computer-implemented method of claim 7, wherein the generating feature scores representing features of the suspected distress call based on the text and vocal metrics further comprises:
generating a feature score for tone based at least in part on a vocal metric of pitch for the suspected distress call;
generating a feature score for inflection based at least in part on a vocal metric of volume for the suspected distress call;
generating a feature score for phrasing based at least in part on analysis of a sequence of words in the suspected distress call; and
generating a feature score for sentiment based at least in part on an extent to which an emotion is conveyed in the suspected distress call.

10. The computer-implemented method of claim 7, wherein receiving a suspected distress call in audio format further comprises:
selecting a subset of frequency bins that are most likely to include human voice distress calls based on analysis of historical authentic distress calls;
detecting the suspected distress call in the subset of the frequency bins; and
in response to detecting the human voice in the subset of the frequency bins, begin recording the suspected distress call.

11. The computer-implemented method of claim 7, wherein in response to the classification of the suspected distress call to be the authentic distress call, the alert causes an initiation of a rescue.

12. The computer-implemented method of claim 7, further comprising:
before converting the suspected distress call into text, iteratively training a machine learning model with audio noise to identify human voice as an anomaly in noise until a threshold is satisfied for a word error rate of text converted from audio extracted as the anomaly; and
extracting data that represents the suspected distress call from audio content by detecting the suspected distress call as an anomaly in the audio content using the trained machine learning model.

13. A computing system, comprising:
at least one processor;
a radio receiver configured to scan a distress frequency; and
a non-transitory computer readable medium including instructions stored thereon that when executed by at least the processor cause the computing system to:
autonomously discriminate a human voice from radiofrequency noise from a radio signal in audio content that is received from the radio receiver;
extract data that represents the human voice from the audio content using an anomaly detection model that has been iteratively trained to reduce a word error rate in speech recognition by:
(a) generating second audio content that is estimated for the audio content by the anomaly detection model, wherein the anomaly detection model is trained on second radiofrequency noise of radio signals that do not include voice to approximate the radiofrequency noise overlaying the human voice in the audio content; and
(b) generating a residual surface from (i) the audio content that includes the human voice and the radiofrequency noise and (ii) the second audio content that is estimated for the audio content by the anomaly detection model, wherein the data that represents the human voice is the residual surface;
determine a cumulative mean absolute error from the residual surface;
recognize speech in the data that represents the human voice to transform the data that represents the human voice into vocal metrics;
generate feature scores that represent features of the recognized speech including at least one of tone or inflection, wherein the feature scores are generated based at least in part on the vocal metrics;
classify the human voice as either a hoax distress call or an authentic distress call based on the feature scores;
include in an alert a detection confidence factor that the human voice extracted is actually a human voice, wherein the detection confidence factor is based on the cumulative mean absolute error; and
present the alert indicating that the human voice is one of the hoax distress call or the authentic distress call with a hoax confidence factor that the human voice is correctly classified as the hoax distress call or the authentic distress call.

14. The computing system of claim 13, wherein the instructions further cause the computing system to:
generate a residual surface from the audio content that includes the human voice and second audio content that does not include human voice;
apply a first weight to residuals of the residual surface in response to the classification of the human voice as the hoax distress call, or apply a second weight to the residuals of the residual surface in response to the classification of the human voice as the authentic distress call; and
determine a cumulative mean absolute error from the residual surface;
wherein the hoax confidence factor is based on the cumulative mean absolute error.

15. The computing system of claim 13, wherein the instructions further cause the computing system to iteratively train the anomaly detection model with audio noise to identify human voice as an anomaly in noise until a threshold is satisfied for the word error rate of text recognized from the data that represents the human voice extracted as the anomaly.

16. The computing system of claim 13, wherein the instructions to extract the human voice from the audio content of the radio signal further cause the computing system to:
divide a spectrum of the audio content into a set of frequency bins;
select a subset of the frequency bins that are most likely to include human voice distress calls;
detect the human voice in the subset of the frequency bins with a first machine learning model that has been trained to identify human voice in the subset of frequency bins as an anomaly;
in response to detecting the human voice in the subset of the frequency bins, begin recording time series signals for the set of frequency bins;
detect that the human voice has ceased in the subset of the frequency bins with a second machine learning model; and
in response to detecting that the human voice has ceased for a pre-determined amount of time, end recording the time series signals for the set of frequency bins.

17. The computing system of claim 16, wherein the instructions to extract the human voice from the recorded time series signals further cause the computing system to:
generate a time series signal from each bin in the set of frequency bins to produce a set of time series signals;
generate an estimated time series signal for each time series signal based on the other time series signals in the set of time series signals;
generate residuals between each time series signal in the set of time series signals and the estimated time series signal estimated for the time series signal to produce a set of residual time series signals; and
provide the set of residual time series signals as the data that represents the human voice extracted from the audio content, wherein the data that represents the human voice that is extracted from the audio content is denoised based on the estimated time series signals.

18. The computer-implemented method of claim 7, wherein when the human voice is an authentic distress call, the method further comprises automatically dispatching rescue resources by an electronic message to rescuers.

19. The computer-implemented method of claim 7, wherein the human voice falls below a noise floor of the radio signal.

20. The computer-implemented method of claim 7, wherein the extraction ML model is a multivariate ML anomaly detection model, the method further comprising:
select a set of audio frequencies that are associated with human voice;
configure the extraction ML model to receive the set of audio frequencies from the second static noise of radio signals that do not include voice as multivariate training input to the extraction ML model; and
iteratively (a) train the extraction ML model on the set of audio frequencies from the second static noise to identify human voice as an anomaly in the second static noise, and (b) test the extraction ML model on the set of audio frequencies from training audio content that includes test human voice and test static noise from a test radio signal, until word error rate in speech recognition of the test voice identified as an anomaly satisfies a threshold.

* * * * *